US010408442B2

(12) United States Patent
Treible, Jr. et al.

(10) Patent No.: US 10,408,442 B2
(45) Date of Patent: Sep. 10, 2019

(54) HAZARDOUS LOCATION LIGHT FIXTURE HOUSINGS

(71) Applicant: Cooper Technologies Company, Houston, TX (US)

(72) Inventors: Daniel Robert Treible, Jr., Liverpool, NY (US); Joseph Michael Manahan, Manlius, NY (US); Andrew Francis Scarlata, West Monroe, NY (US); Adam Douglas Ledgerwood, Syracuse, NY (US); Matthew Thomas Pernot, Kirkville, NY (US); Kyle Patrick Desrosiers, Lyman, SC (US); Mevzad Ljuca, Manlius, NY (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 15/830,787

(22) Filed: Dec. 4, 2017

(65) Prior Publication Data
US 2018/0156439 A1 Jun. 7, 2018

Related U.S. Application Data

(60) Provisional application No. 62/429,580, filed on Dec. 2, 2016.

(51) Int. Cl.
*F21S 4/00* (2016.01)
*F21V 25/12* (2006.01)
(Continued)

(52) U.S. Cl.
CPC .............. *F21V 25/12* (2013.01); *F21V 5/04* (2013.01); *F21V 15/01* (2013.01); *F21V 17/02* (2013.01);
(Continued)

(58) Field of Classification Search
CPC .......................... F21V 21/005; F21V 23/005
(Continued)

(56) References Cited

U.S. PATENT DOCUMENTS

| 5,578,905 A | 11/1996 | Graber |
| 5,890,797 A | 4/1999 | Bish |

(Continued)

FOREIGN PATENT DOCUMENTS

| CA | 137428 | 9/2011 |
| CN | 201443739 | 4/2010 |

(Continued)

OTHER PUBLICATIONS

I. Istomin, International Search Report and Written Opinion issued in application No. PCT/US2017/064438, completion date Mar. 13, 2018, dated Mar. 22, 2018, 8 pages, Federal Institute of Industrial Property, Moscow, Russia.

(Continued)

*Primary Examiner* — Daniel St Cyr
(74) *Attorney, Agent, or Firm* — King & Spalding LLP

(57) ABSTRACT

A housing for a light fixture includes at least one wall that forms a cavity and a light source housing portion, where the at least one wall includes a thermally-conductive material, where the light source housing portion is configured to receive at least one light source. The housing can also include a wireway disposed between the cavity and the light source housing portion. The housing can further include multiple heat sink fins that extend from an outer surface of the at least one wall. The housing can also include at least one air throughway that exposes at least a portion of the wireway between the at least one wall and the light source housing portion, where the at least one air throughway (Continued)

allows air to pass over the portion of the wireway, where the at least one air throughway is formed independent of the heat sink fins.

19 Claims, 29 Drawing Sheets

(51) Int. Cl.
| | | |
|---|---|---|
| F21V 29/77 | (2015.01) | |
| F21V 29/83 | (2015.01) | |
| F21V 15/01 | (2006.01) | |
| F21V 17/02 | (2006.01) | |
| F21V 17/10 | (2006.01) | |
| F21V 23/06 | (2006.01) | |
| G01V 8/12 | (2006.01) | |
| H05B 37/02 | (2006.01) | |
| F21V 19/00 | (2006.01) | |
| H01Q 1/00 | (2006.01) | |
| H05B 33/08 | (2006.01) | |
| F21V 5/04 | (2006.01) | |
| H01Q 1/42 | (2006.01) | |
| H01Q 19/06 | (2006.01) | |
| F21V 3/00 | (2015.01) | |
| F21V 31/00 | (2006.01) | |
| F21V 23/04 | (2006.01) | |
| F21Y 115/10 | (2016.01) | |

(52) U.S. Cl.
CPC ........ *F21V 17/107* (2013.01); *F21V 19/0015* (2013.01); *F21V 23/06* (2013.01); *F21V 29/77* (2015.01); *F21V 29/773* (2015.01); *F21V 29/83* (2015.01); *G01V 8/12* (2013.01); *H01Q 1/002* (2013.01); *H01Q 1/42* (2013.01); *H01Q 19/06* (2013.01); *H05B 33/0845* (2013.01); *H05B 37/0218* (2013.01); *H05B 37/0227* (2013.01); *H05B 37/0245* (2013.01); *H05B 37/0272* (2013.01); *H05B 37/0281* (2013.01); *F21V 3/00* (2013.01); *F21V 23/0471* (2013.01); *F21V 31/005* (2013.01); *F21Y 2115/10* (2016.08)

(58) Field of Classification Search
USPC .......... 362/227, 232, 249.01, 249.05, 249.11
See application file for complete search history.

(56) References Cited

U.S. PATENT DOCUMENTS

| | | | |
|---|---|---|---|
| 6,034,325 A | 3/2000 | Nattel et al. | |
| D592,799 S | 5/2009 | Scott | |
| 7,648,373 B2* | 1/2010 | Dixon | H01R 13/502 174/359 |
| 7,741,782 B2 | 6/2010 | Vermeulen et al. | |
| D639,500 S | 6/2011 | Choi et al. | |
| 7,965,336 B2 | 6/2011 | Bingle et al. | |
| D646,016 S | 9/2011 | Choi et al. | |
| D656,262 S | 3/2012 | Yoshinobu et al. | |
| D656,263 S | 3/2012 | Ogawa et al. | |
| 8,232,909 B2 | 7/2012 | Kroeger et al. | |
| D672,480 S | 12/2012 | Maxik et al. | |
| 8,322,897 B2 | 12/2012 | Blincoe et al. | |
| D684,286 S | 6/2013 | Rashidi | |
| D699,889 S | 2/2014 | Fletcher et al. | |
| 8,657,626 B2* | 2/2014 | Duval | H01R 13/5205 439/583 |
| D700,991 S | 3/2014 | Johnson et al. | |
| 9,404,624 B2 | 8/2016 | Chung | |
| 9,442,215 B2 | 9/2016 | Kovacs et al. | |
| D776,836 S | 1/2017 | Tang | |
| 9,626,847 B2 | 4/2017 | Spiro | |
| D802,197 S | 11/2017 | Ding et al. | |
| D803,427 S | 11/2017 | Germain | |
| D809,176 S | 1/2018 | Partington | |
| D822,859 S | 7/2018 | Wang et al. | |
| 10,260,722 B2 | 4/2019 | Treible, Jr. et al. | |
| 2004/0183744 A1 | 9/2004 | Raiman | |
| 2005/0183344 A1 | 8/2005 | Ziobro et al. | |
| 2008/0062705 A1 | 3/2008 | Czech et al. | |
| 2009/0081963 A1 | 3/2009 | Boren | |
| 2010/0270933 A1 | 10/2010 | Chemel et al. | |
| 2011/0194280 A1 | 8/2011 | Ruffin, Jr. et al. | |
| 2012/0206050 A1 | 8/2012 | Spero | |
| 2012/0040606 A1 | 11/2012 | Verfuerth | |
| 2012/0274208 A1 | 11/2012 | Chen et al. | |
| 2013/0021808 A1 | 1/2013 | Harbers et al. | |
| 2013/0200807 A1 | 8/2013 | Mohan et al. | |
| 2013/0314921 A1 | 11/2013 | Chen | |
| 2014/0085912 A1 | 3/2014 | David et al. | |
| 2015/0285480 A1 | 10/2015 | Chien et al. | |
| 2015/0338074 A1 | 11/2015 | Chen et al. | |
| 2015/0351195 A1 | 12/2015 | Sargent et al. | |
| 2016/0356474 A1 | 12/2016 | Jayawardena | |
| 2017/0079121 A1 | 3/2017 | Jayawardena et al. | |
| 2017/0156189 A1 | 6/2017 | Jayawardena et al. | |
| 2017/0184659 A1 | 6/2017 | Jayawardena et al. | |

FOREIGN PATENT DOCUMENTS

| | | |
|---|---|---|
| CN | 201954375 | 8/2011 |
| CN | 202432348 | 9/2012 |
| WO | 2013111134 | 8/2013 |
| WO | 2016176455 | 11/2016 |

OTHER PUBLICATIONS

V. Surikov, International Search Report and Written Opinion issued in application No. PCT/US2017/054961, completion date Jan. 15, 2018, dated Jan. 18, 2018, 8 pages, Federal Institute of Industrial Property, Moscow, Russia.
S. Surikov, International Search Report and Written Opinion issued in application No. PCT/US2017/054957, completion date Dec. 25, 2017, dated Jan. 25, 2018, 9 pages, Federal Institute of Industrial Property, Moscow, Russia.
S. Surikov, International Search Report and Written Opinion issued in application No. PCT/US2017/064443, completion date Apr. 28, 2018, dated May 10, 2018, 7 pages, Federal Institute of Industrial Property, Moscow, Russia.
Translation of CN202432348 via LexisNexis Total Patents, Jun. 6, 2018, 6 pages.
Translation of CN201954375 via LexisNexis Total Patents, Jun. 6, 2018, 4 pages.
Translation of CN201443739 via LexisNexis Total Patents, Jun. 6, 2018, 6 pages.
Examiner's Report issued in Canadian Application No. 180642, dated Feb. 7, 2019, 1 page.

* cited by examiner

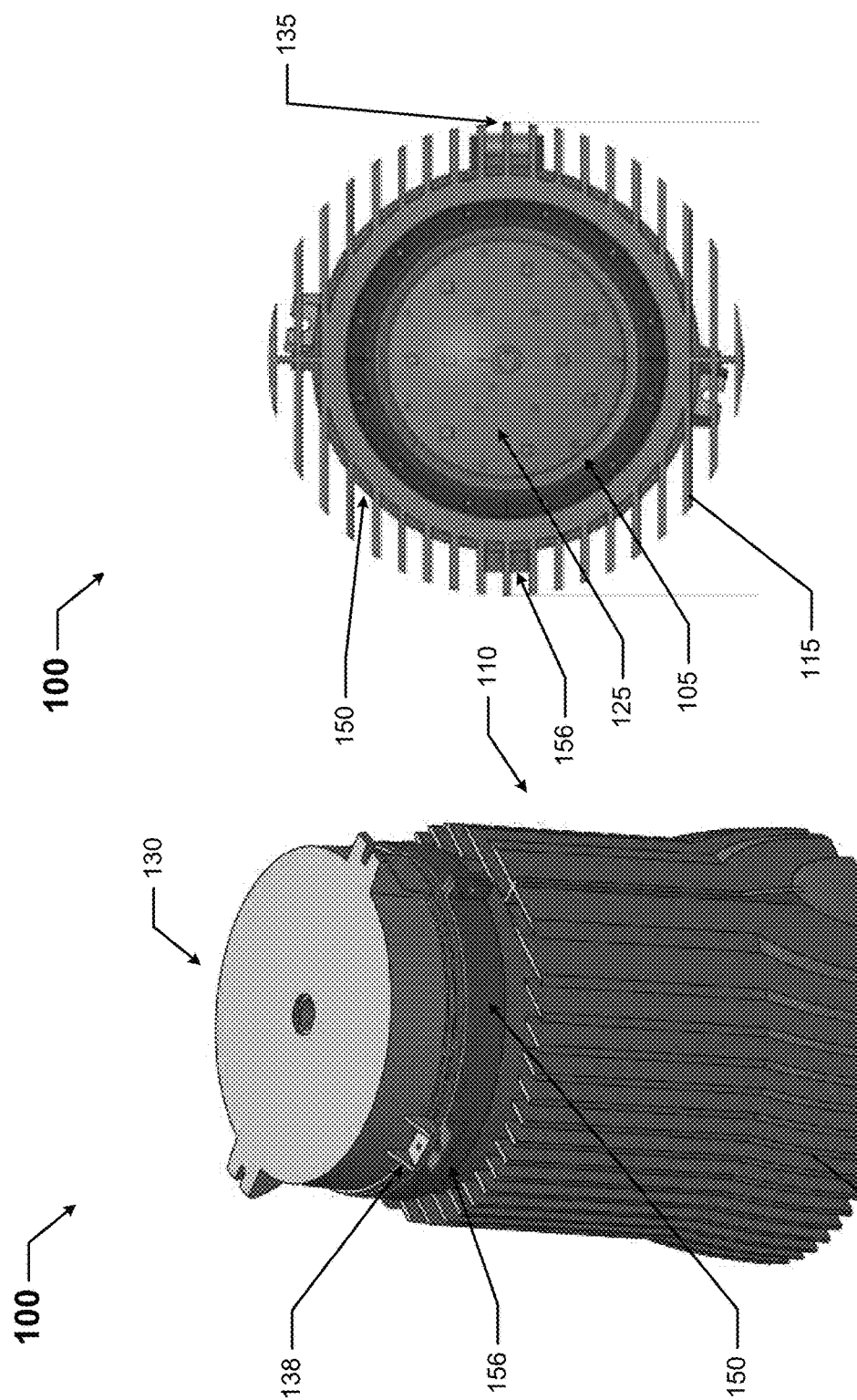

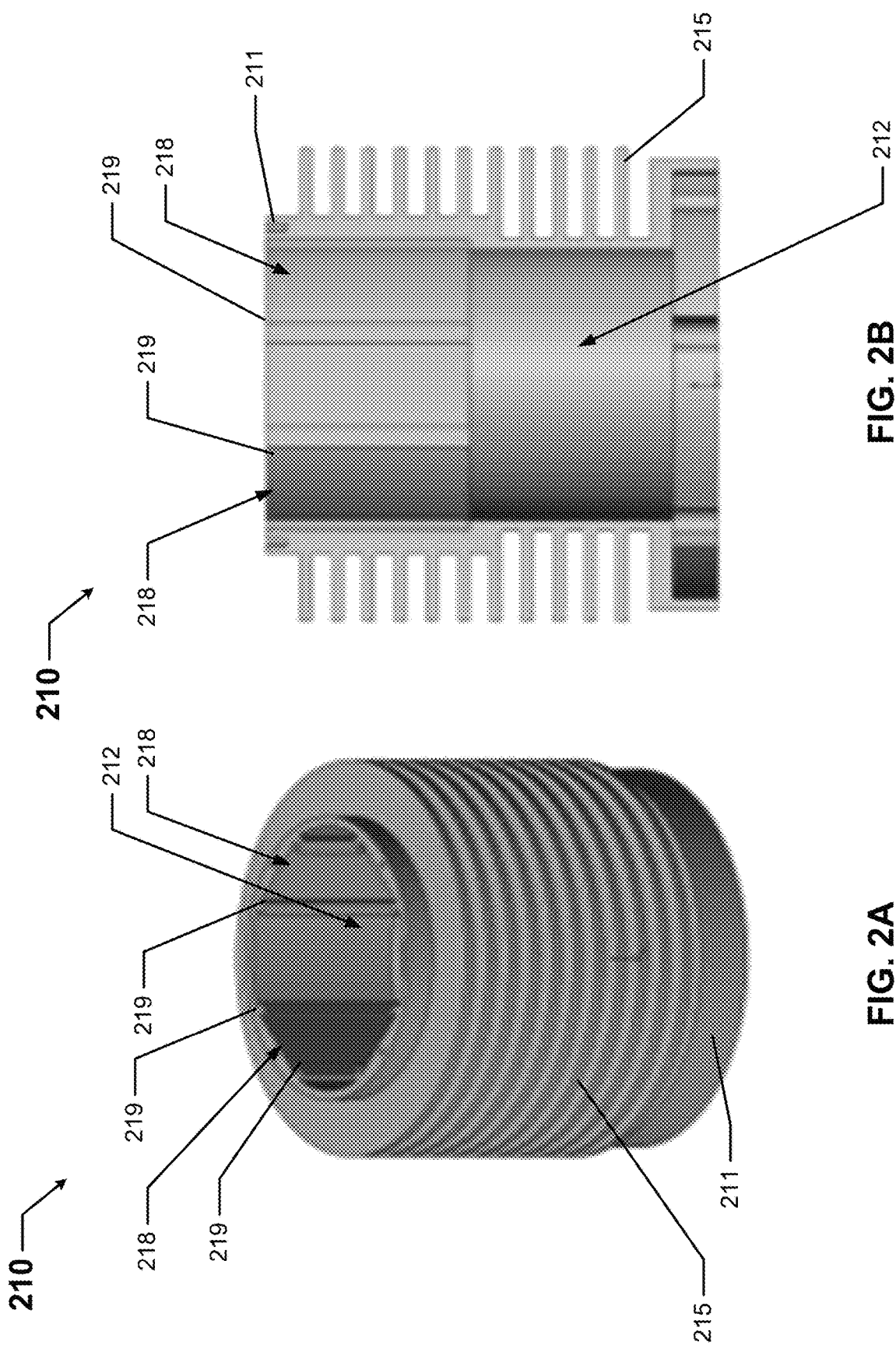

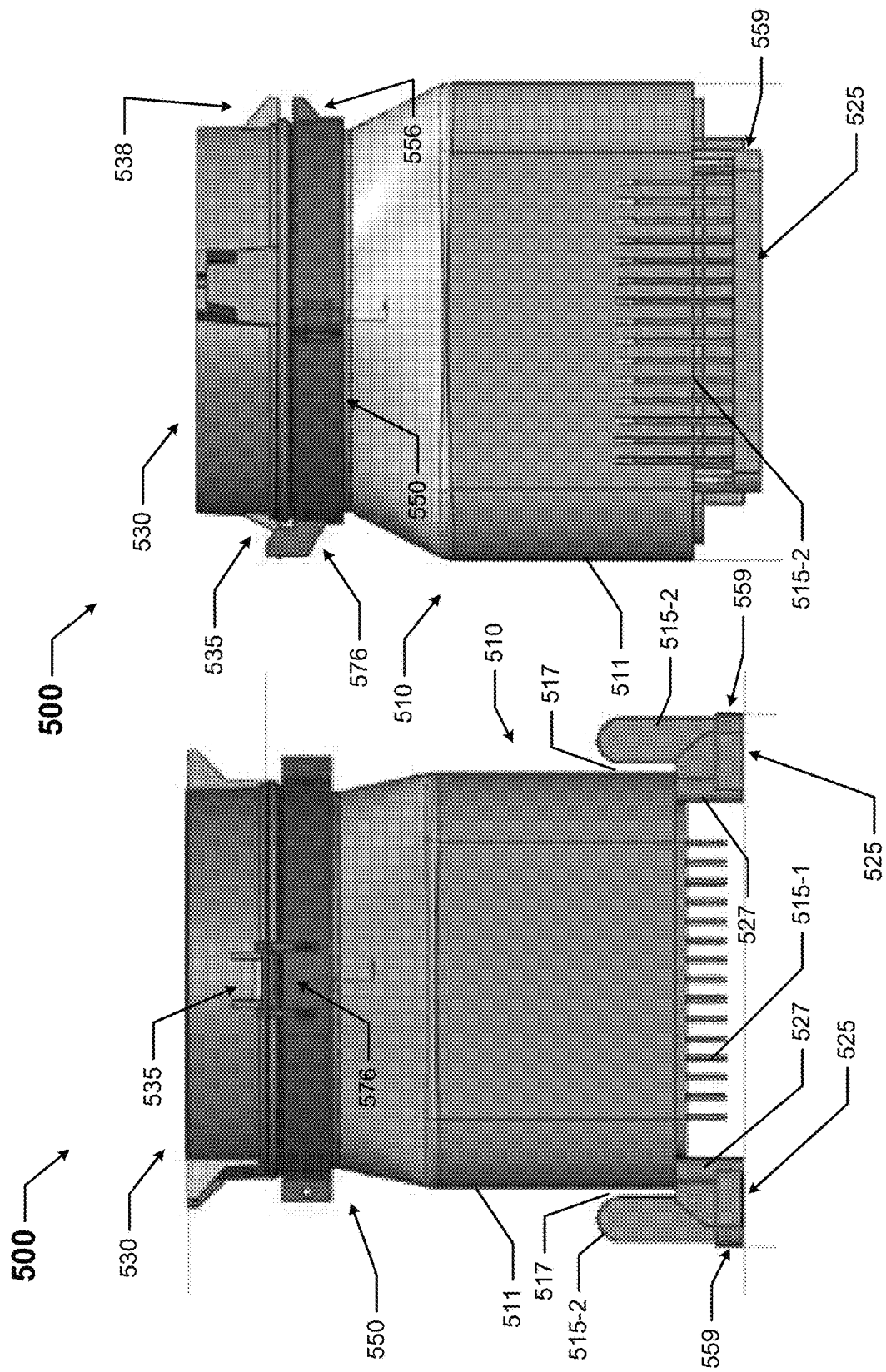

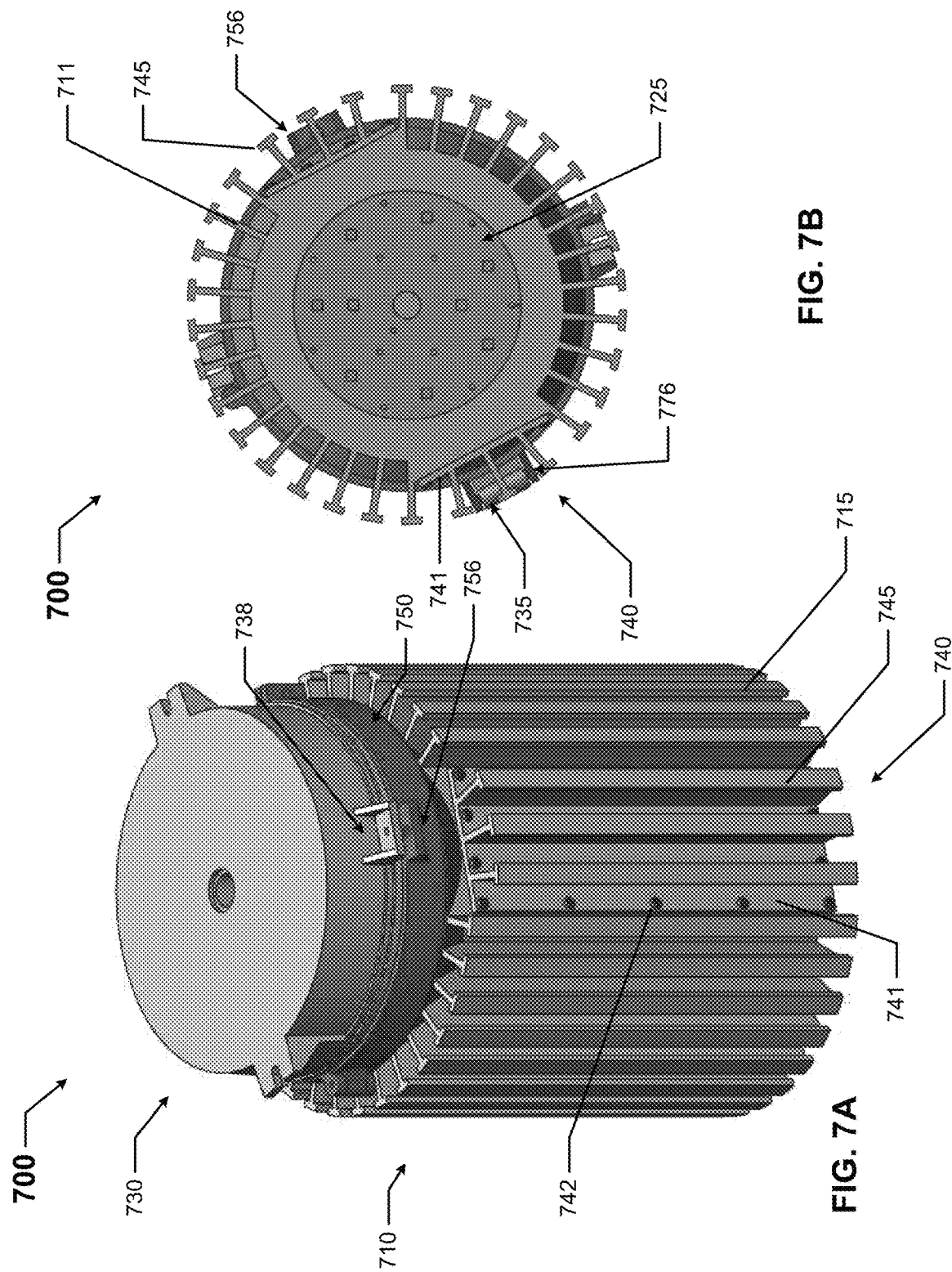

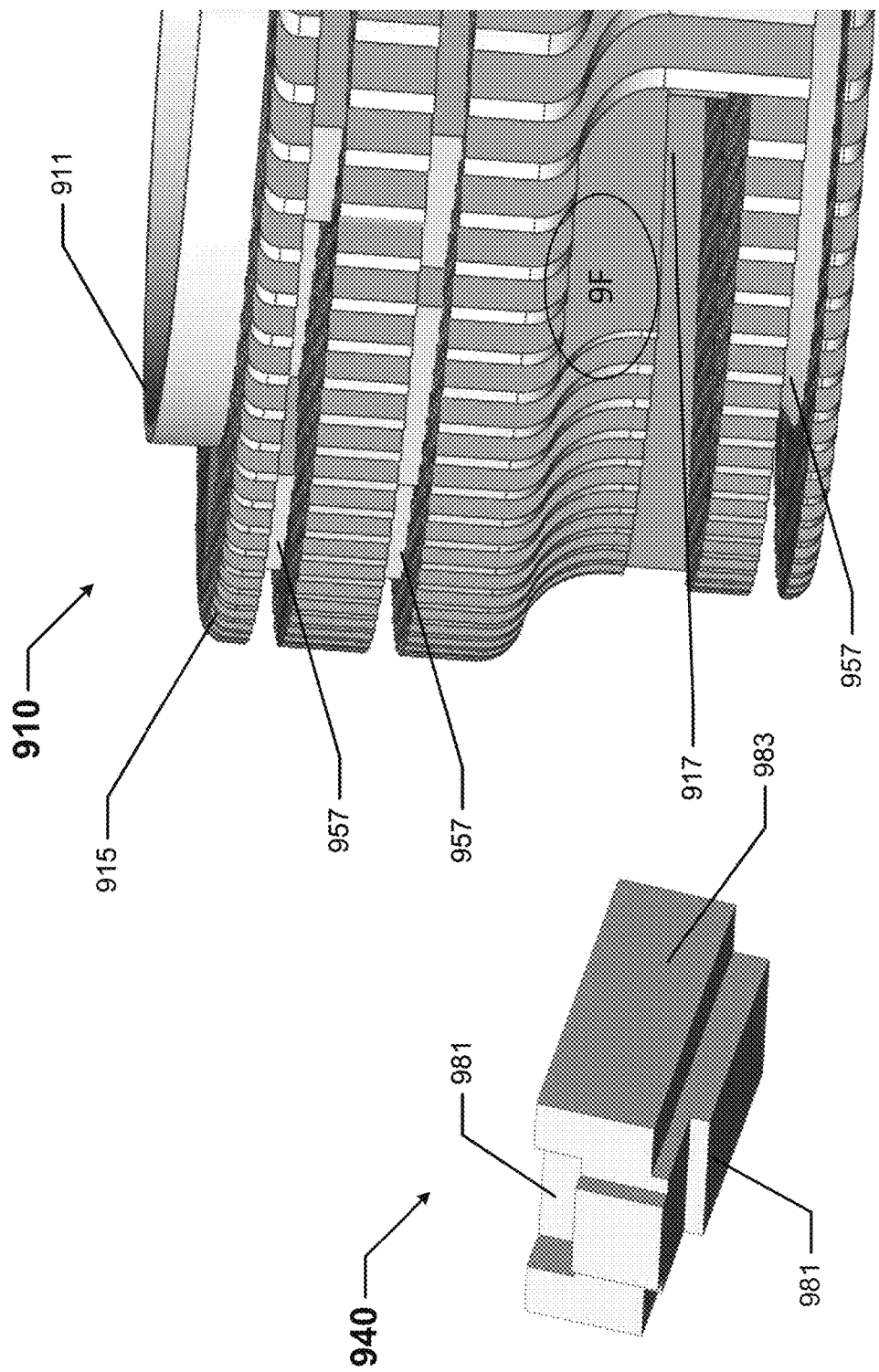

HAZARDOUS LOCATION LIGHT FIXTURE HOUSINGS

CROSS-REFERENCE TO RELATED APPLICATIONS

This application claims priority under 35 U.S.C. § 119 to U.S. Provisional Patent Application Ser. No. 62/429,580, titled "Hazardous Location Light Fixtures" and filed on Dec. 2, 2016. This application is also related to U.S. Provisional Patent Application Ser. No. 62/271,762, titled "Prognostic and Health Monitoring Systems For Light Fixtures" and filed on Dec. 28, 2015. The entire contents of these aforementioned applications are hereby incorporated herein by reference.

TECHNICAL FIELD

The present disclosure relates generally to light fixtures, and more particularly to systems, methods, and devices for housings for light fixtures.

BACKGROUND

Light fixtures are used in a variety of environments. Many of these light fixtures use advanced technology with a number of components. As a result, these light fixtures can have a number of failure points. In lighting applications, such as hazardous environments, reliability of the lighting system is vital. Unfortunately, the characteristics (e.g., humidity, extreme temperatures, corrosive gas) of these environments can cause the failure of one or more components of a light fixture to be accelerated. Further, the health and safety of a person located in such an environment can be at risk, with or without the person's knowledge. When a light fixture is placed in certain environments, such as a hazardous environment, some of these components of a light fixture can pose a safety hazard and a violation of applicable standards if the components are not properly engineered and integrated with the rest of the light fixture.

SUMMARY

In general, in one aspect, the disclosure relates to a housing for a light fixture. The housing can include at least one wall that forms a cavity and a light source housing portion, where the at least one wall includes a thermally-conductive material, where the light source housing portion is configured to receive at least one light source. The housing can also include a wireway disposed between the cavity and the light source housing portion. The housing can further include multiple heat sink fins that extend from an outer surface of the at least one wall. The housing can also include at least one air throughway that exposes at least a portion of the wireway between the at least one wall and the light source housing portion, where the at least one air throughway allows air to pass over the portion of the wireway, where the at least one air throughway is formed independent of the heat sink fins.

In another aspect, the disclosure can generally relate to a housing for a light fixture. The housing can include at least one wall that forms a cavity, wherein the at least one wall comprises a thermally-conductive material. The housing can also include at least one positioning feature that is configured to position at least one component of the light fixture within the cavity, where the at least one component generates heat when operating.

In yet another aspect, the disclosure can generally relate to a housing for a light fixture. The housing can include at least one wall that forms a cavity, where the at least one wall includes a thermally-conductive material, a cover receiving feature, and at least one first coupling feature, where the cover receiving feature is configured to couple to a cover of the light fixture. The housing can also include at least one removable section removably coupled to the at least one wall, where the at least one removable section includes at least one second coupling feature that couples to the at least one first coupling feature of the at least one wall, where the at least one removable section covers an opening in the at least one wall.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 1A-1I show a light fixture in accordance with certain example embodiments.

FIGS. 2A and 2B show a housing for a light fixture in accordance with certain example embodiments.

FIGS. 5A-5D show another light fixture in accordance with certain example embodiments.

FIGS. 7A-7D show still another light fixture in accordance with certain example embodiments.

FIGS. 9A-9F show still another housing for a light fixture in accordance with certain example embodiments.

DETAILED DESCRIPTION

Figure 1A:
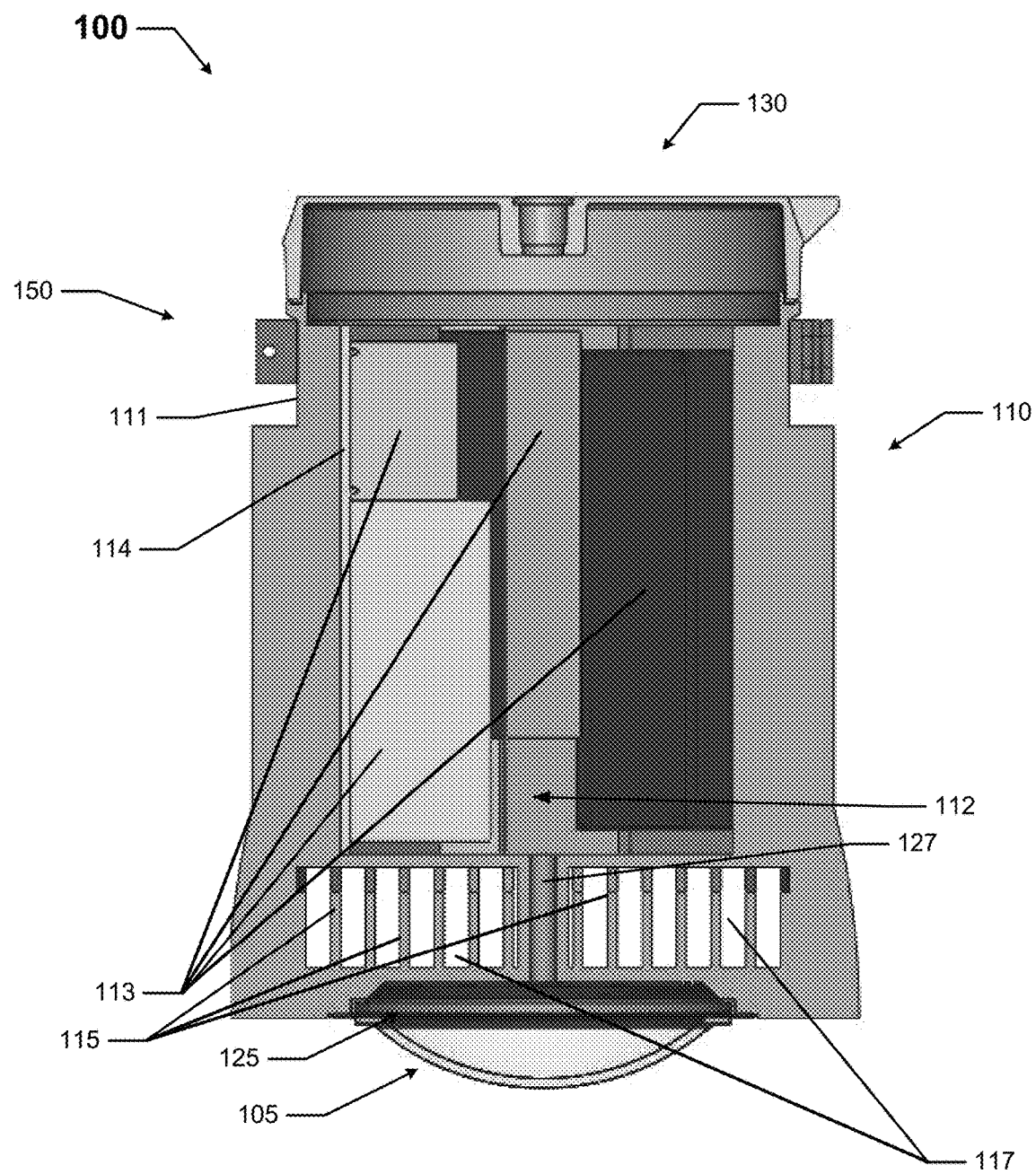

In general, example embodiments provide systems, methods, and devices for hazardous location light fixture housings. Example hazardous location light fixture housings provide a number of benefits. Such benefits can include, but are not limited to, preventing abrupt failure of light fixtures in critical applications, longer useful life of light fixtures, improved safety in areas where example light fixtures are located, reduced operating costs, and compliance with industry standards that apply to light fixtures located in certain environments.

In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. Also, while example housings are directed toward light fixtures located in hazardous environments, light fixtures with example housings can be used in any of a number of other environments. A user may be any person that interacts with light fixtures. Examples of a user may include, but are not limited to, an engineer, an electrician, an instrumentation and controls technician, a mechanic, an operator, a consultant, an inventory management system, an inventory manager, a foreman, a labor scheduling system, a contractor, and a manufacturer's representative.

The example light fixture housings described herein can be made of one or more of a number of suitable materials to allow the light fixture and/or other associated components of a system to meet certain standards and/or regulations while also maintaining durability and efficient thermal transfer in light of the one or more conditions under which the light fixtures and/or other associated components of the system can be exposed. Examples of such materials can include, but are not limited to, aluminum, stainless steel, fiberglass, glass, plastic, ceramic, and rubber. As a particular example, the example housings described herein can be made of a thermally-conductive material.

Example light fixture housings (or portions thereof) described herein can be made from a single piece (as from a mold, injection mold, die cast, or extrusion process). In addition, or in the alternative, example light fixture housings (or portions thereof) can be made from multiple pieces that are mechanically coupled to each other. In such a case, the multiple pieces can be mechanically coupled to each other using one or more of a number of coupling methods, including but not limited to epoxy, welding, fastening devices, detents, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, retaining, abutting against, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example light fixture housing to become mechanically coupled, directly or indirectly, to another portion of the light fixture housing and/or another component of the light fixture (e.g., a cover). A coupling feature can include, but is not limited to, a portion of a hinge, an aperture, a recessed area, a protrusion, a slot, a spring clip, a male connector end, a female connector end, a tab, a detent, and mating threads. One portion of an example light fixture can be coupled to another portion of the light fixture by the direct use of one or more coupling features.

In addition, or in the alternative, a portion of an example light fixture housing can be coupled to another portion of the light fixture housing and/or another component (e.g., a cover) of the light fixture using one or more independent devices that interact with one or more coupling features disposed on the light fixture housing. Examples of such devices can include, but are not limited to, a pin, a male connector end, a female connector end, a hinge, epoxy, adhesive, welding, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of hazardous location light fixture housings, one or more of the components shown may be omitted, repeated, and/or substituted. Accordingly, example embodiments of hazardous location light fixture housings should not be considered limited to the specific arrangements of components shown in any of the figures. For example, features shown in one or more figures or described with respect to one embodiment can be applied to another embodiment associated with a different figure or description.

While example embodiments described herein are directed to light fixtures, the housings described herein can also be applied to any other type of electrical enclosure, whether within or outside of a hazardous environment. As defined herein, an electrical enclosure is any type of cabinet or housing inside of which is disposed electrical, mechanical, electro-mechanical, and/or electronic equipment. Such equipment can include, but is not limited to, a controller (also called a control module), a hardware processor, a power supply (e.g., a battery, a driver, a ballast), a sensor module, a safety barrier, a sensor, sensor circuitry, a light source, electrical cables, and electrical conductors. Aside from a housing for a light fixture, examples of an electrical enclosure can include, but are not limited to, a housing for a sensor device, an electrical connector, a junction box, a motor control center, a breaker box, an electrical housing, a conduit, a control panel, an indicating panel, and a control cabinet.

In certain example embodiments, light fixtures having example housings are subject to meeting certain standards and/or requirements. For example, the National Electric Code (NEC), the National Electrical Manufacturers Association (NEMA), the International Electrotechnical Commission (IEC), Underwriters Laboratories (UL), the Federal Communication Commission (FCC), the Illuminating Engineering Society (IES), and the Institute of Electrical and Electronics Engineers (IEEE) set standards as to electrical enclosures, wiring, and electrical connections. Use of example embodiments described herein meet (and/or allow a corresponding device to meet) such standards when required. In some (e.g., PV solar) applications, additional standards particular to that application may be met by the electrical enclosures described herein.

For example, example housings, when integrated with light fixtures, can allow the light fixture to meet the NEMA 4x standard. In such a case, the light fixture is constructed to provide a degree of protection to components (e.g., devices) disposed within the light fixture housing against, at least, corrosion, falling dirt, rain, sleet, snow, ice, windblown dust, splashing water, and hose-directed water. As a specific example, a light fixture with a NEMA 4x rating can provide protection with respect to harmful effects on equipment disposed within the light fixture housing due to ingress of water. Thus, an example light fixture housing must also meet these standards and/or allow the resulting light fixture to meet these standards.

As discussed above, an example light fixture housing can be located in any type of environment (e.g., indoors, outdoors, under water, in a climate controlled room). In addition, or in the alternative, light fixtures with example housings can be located in hazardous and/or marine environments. As defined herein, a hazardous location is any location where the example housing can be exposed to extreme conditions. Extreme conditions can include, but are not limited to, high temperatures, low temperatures, temperature fluctuations, corrosion, humidity, chemicals, chemical vapors, vibrations, and dust. More information about hazardous locations and hazardous location enclosures (such as example light fixture housings) can be found, for example, in Articles 500-506 and Articles 510-517 of the National Electric Code, which is incorporated herein by reference.

A hazardous environment can include an explosive environment, which would require an example light fixture housing to meet one or more requirements, including but not limited to maintaining flame paths. An explosion-proof enclosure is a type of hazardous location electrical enclosure (e.g., a light fixture). In one or more example embodiments, an explosion-proof enclosure (also known as a flame-proof enclosure) is an electrical enclosure that is configured to contain an explosion that originates inside the enclosure. Further, the explosion-proof enclosure is configured to allow gases from inside the explosion-proof enclosure to escape across joints (also called gaps herein) of the explosion-proof enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

In one or more example embodiments, an explosion-proof enclosure (which can include an example light fixture housing) is subject to meeting certain standards and/or requirements. For example, NEMA sets standards with which an electrical enclosure must comply in order to qualify as an explosion-proof enclosure. Specifically, NEMA Type 7, Type 8, Type 9, and Type 10 enclosures set standards with which an explosion-proof enclosure within certain hazardous locations must comply. For example, a NEMA Type 7 standard applies to electrical enclosures constructed for indoor use in certain hazardous locations. Hazardous locations may be defined by one or more of a number of authorities, including but not limited to the National Electric Code (e.g., Class 1, Division I) and UL (e.g., UL 1203). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes (e.g., greater than 100 in$^3$) may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of light fixture housings will be described more fully hereinafter with reference to the accompanying drawings, in which example embodiments of light fixture housings are shown. Light fixture housings may, however, be embodied in many different forms and should not be construed as limited to the example embodiments set forth herein. Rather, these example embodiments are provided so that this disclosure will be thorough and complete, and will fully convey the scope of light fixture housings to those of ordinary skill in the art. Like, but not necessarily the same, elements (also sometimes called components) in the various figures are denoted by like reference numerals for consistency.

Terms such as "first", "second", "top", "bottom", "front", "rear", "side", "end", "left", "right", "outward", and "within" are used merely to distinguish one component (or part of a component or state of a component) from another. Such terms are not meant to denote a preference or a particular orientation, and are not meant to limit embodiments of light fixture housings. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
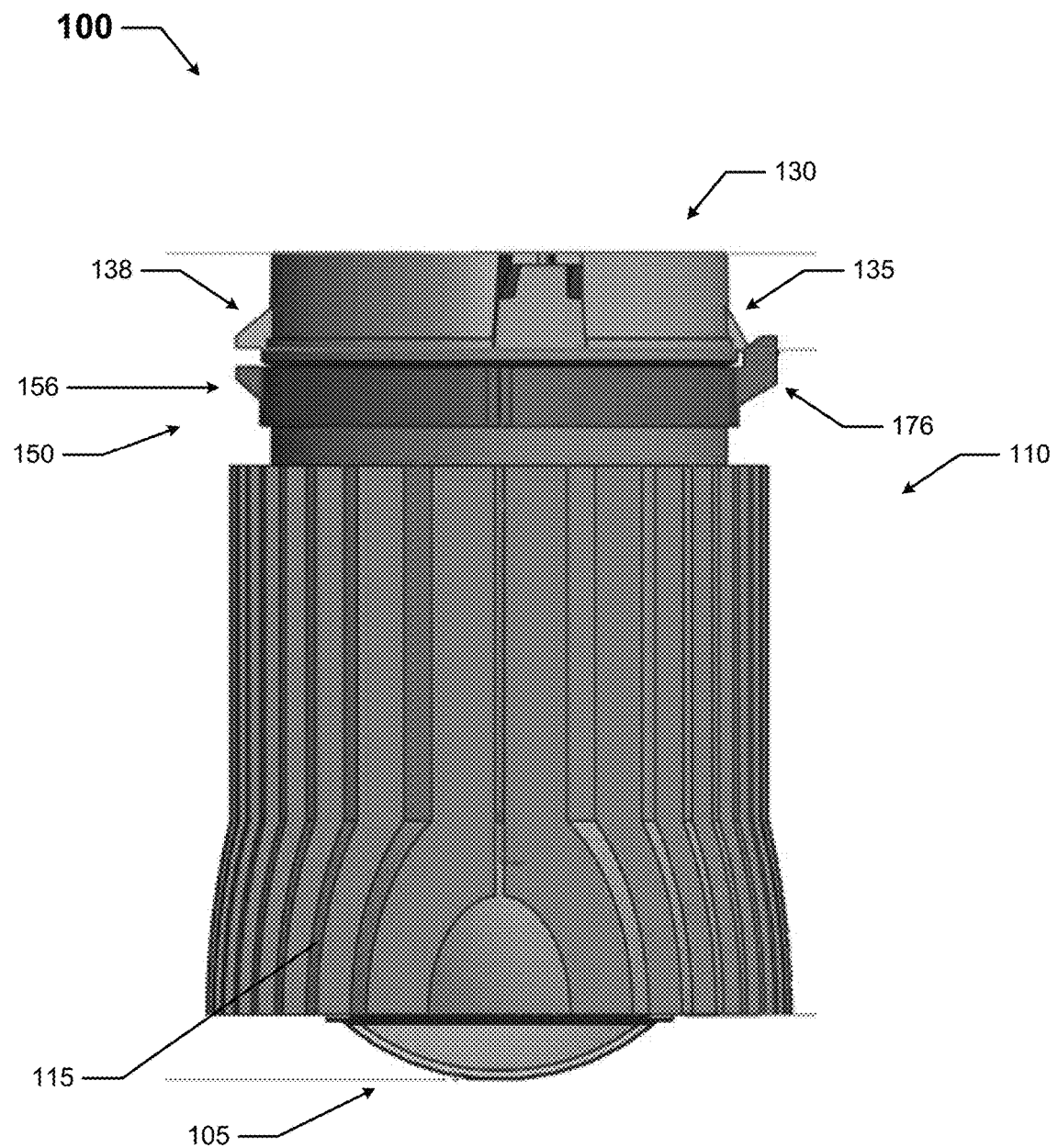
Figure 1E:
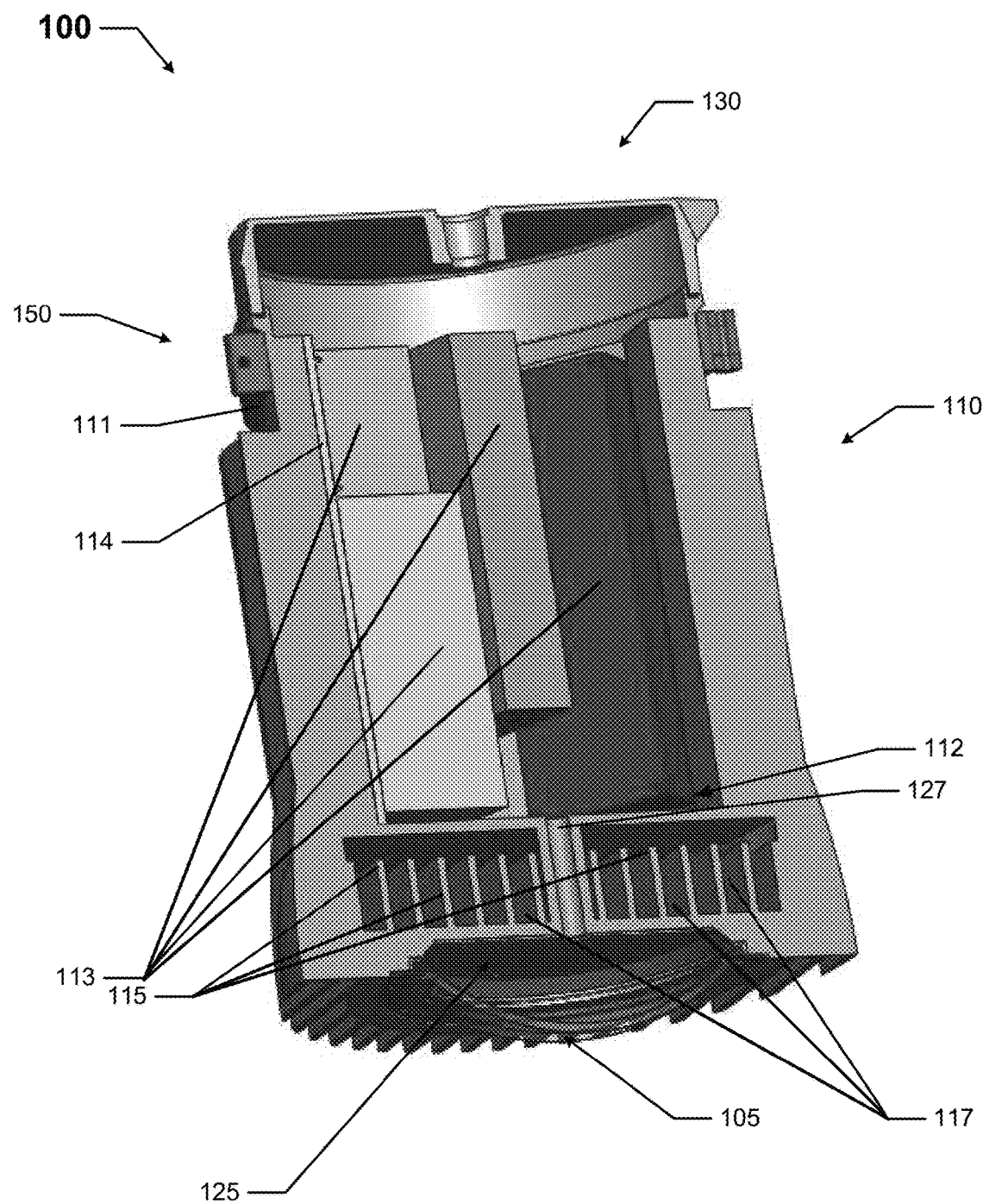
Figure 1F:
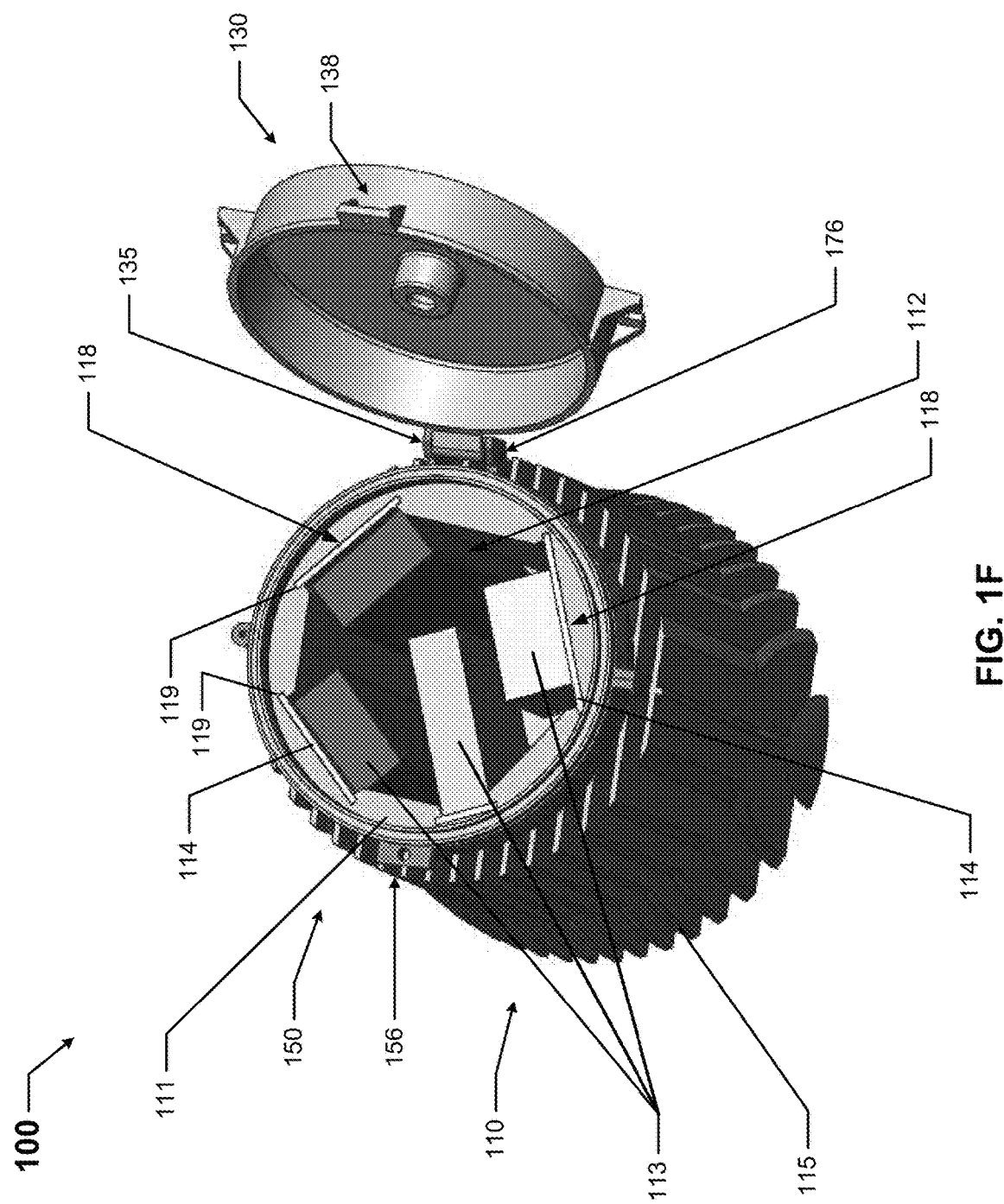
Figure 1G:
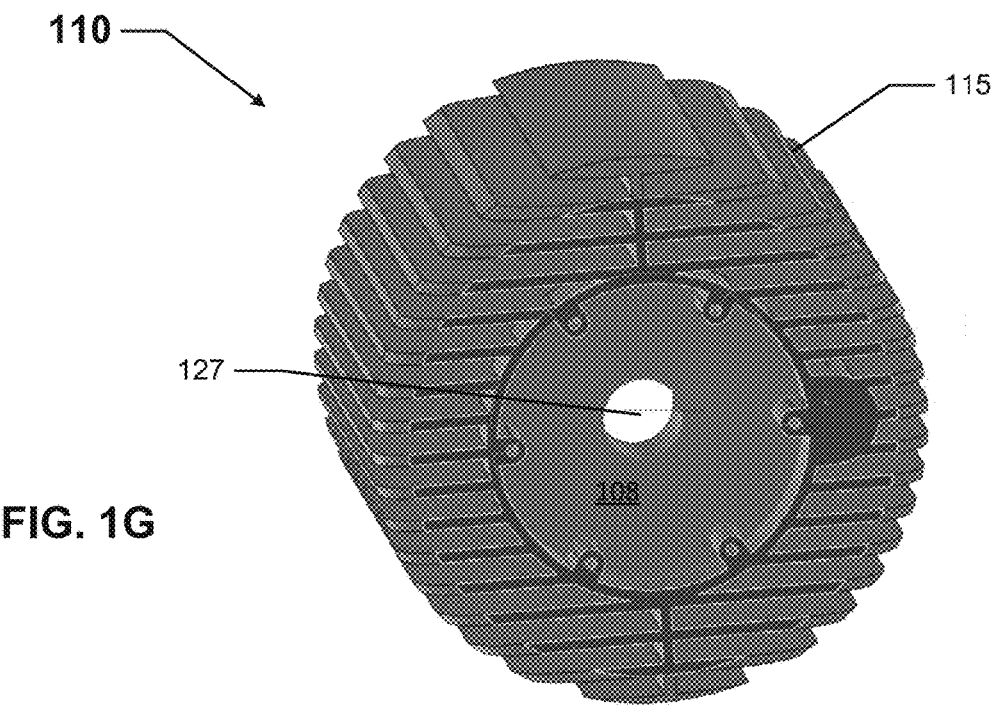
Figure 1H:
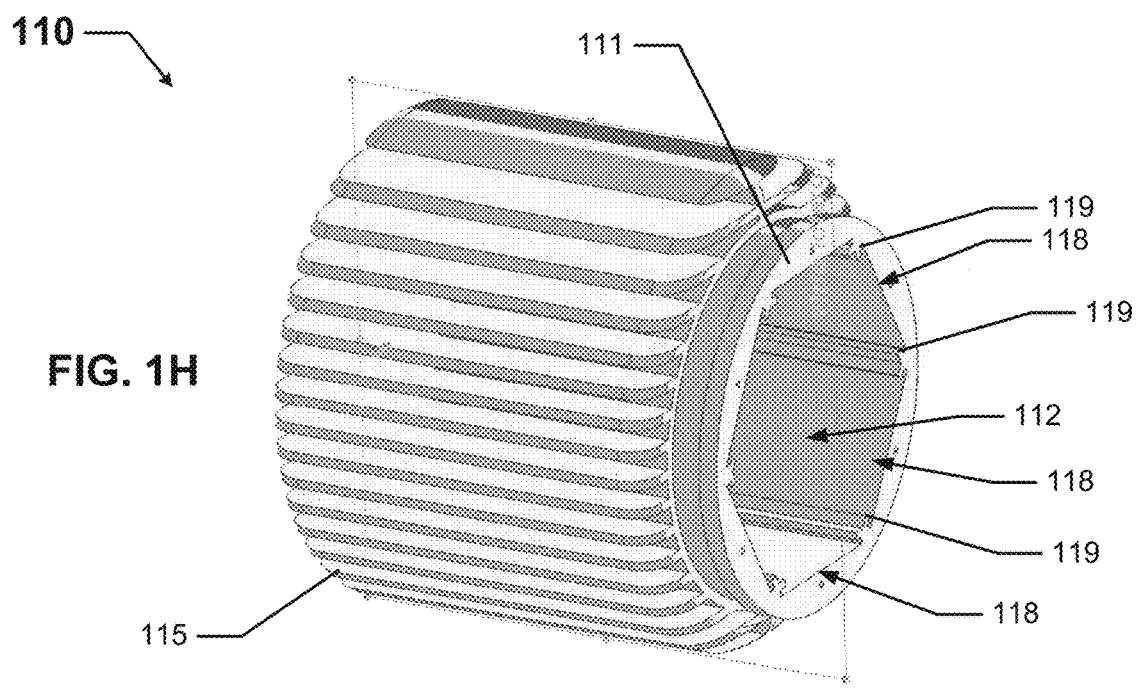
Figure 1I:
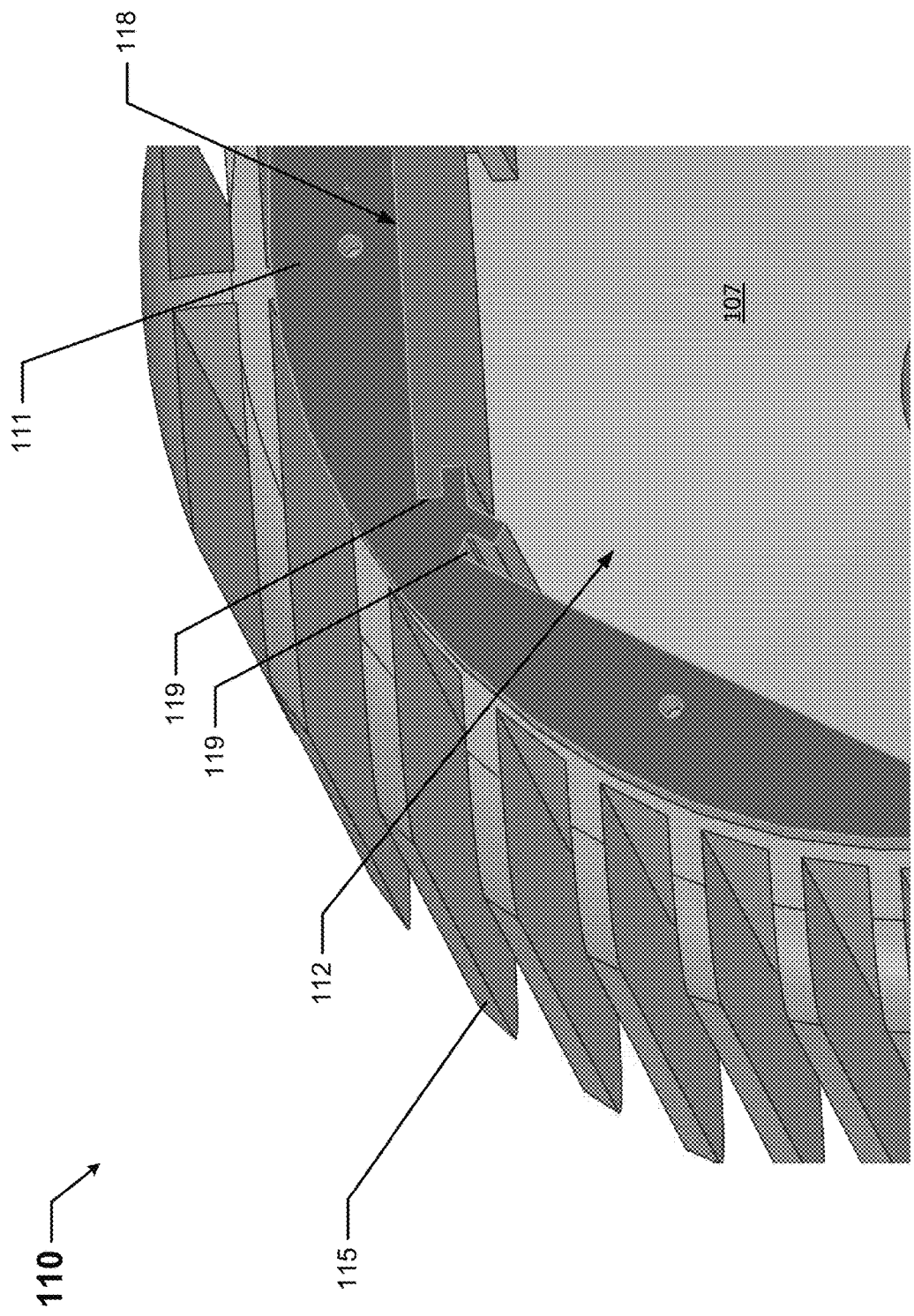

Example light fixture housings can have one or more of a number of unique characteristics and/or features. Several of these characteristics and/or features are shown in the housing 110 of the light fixture 100 of FIGS. 1A-1I. FIG. 1A shows a cross-sectional side view of the light fixture 100. FIG. 1B shows a front view of the light fixture 100. FIG. 1C shows a top-side-front perspective view of the light fixture 100. FIG. 1D shows a bottom view of the light fixture 100. FIG. 1E shows a bottom-side-rear perspective view of the light fixture 100. FIG. 1F shows a top-side-front perspective view of the light fixture 100 with the cover 130 open. FIG. 1G shows a bottom-front-side perspective view of the housing 110 of the light fixture 100. FIG. 1H shows a top-front-side perspective view of the housing 110 of the light fixture 100. FIG. 1I shows a detail of the top-front-side perspective view of the housing 110 of the light fixture 100.

Referring to FIGS. 1A-1I, the unique characteristics and/or features of the housing 110 of the light fixture 100 can include, but are not limited to, positioning features 118 for components 113 within the cavity 112 of the housing 110, air throughways 117 that traverse the width of the housing 110, heat sink fins 115 having a parallel orientation with respect to each other (heat sink fins in the current art are oriented radially), and a housing 110 that is made from a single casting (housings in the current art, at least for those located in hazardous environments, are made from multiple castings).

The housing 110 of the light fixture 100 of FIGS. 1A-1I has at least one wall 111 that forms a cavity 112. The cavity 112 is used to receive one or more electrical devices (e.g., power supplies (e.g., drivers), energy storage devices (e.g., batteries), sensor modules, controllers) that are used in the operation of the light fixture 100. The housing 110 also includes a wireway 127 that passes within one or more walls 111 of the housing 110 to connect the bottom surface 107 of the cavity 112 to one or more light modules 125 disposed against a bottom surface 108 (more generally called a light source housing portion) of the housing 110. Specifically, the wireway 127 can be used to allow one or more electrical conductors to pass therein to electrically couple one or more components 113 in the cavity 112 with the light modules 125. (Generally speaking, the light modules 125 can be categorized as a component 113, but are identified separately here because of their unique location relative to the other components 113.) In some cases, the wireway 127 can be encapsulated (e.g., filled with potting material). A lens 105 is coupled to the bottom of the housing 110 to protect the light modules 125 and, in some cases, to alter (e.g., refract, reflect, diffuse) the light emitted by the light modules 125. In hazardous environments, the lens 105 can also satisfy applicable safety standards and requirements.

As mentioned above, the housing 110 in this example has one or more air throughways 117 that traverse the entire width of the housing 110. In this case, the air throughways 117 are linear, but in some cases, one or more of the air throughways 117 can be non-linear (e.g., serpentine). It should be noted that the air throughways 117 are not merely openings between adjacent parallel heat sink fins 115. Rather, the air throughways 117 in this case actually traverse some or all of the body (the walls 111) of the housing 110, in addition to passing between adjacent heat sink fins 115 before and/or after the air throughways 117. The air throughways 117 can be one large space or a number of spaces. Each space of the air throughways 117 can be divided (fully or partially) or undivided.

In this example, the air throughways 117 are positioned in a plane perpendicular to the wireway 127, allowing ambient air to pass between the cavity 112 housing the components 113 of the light fixture 100 and the light modules 125 (or more generally the light source housing portion of the housing 110 that receives the light modules 125). Also, the air throughways 117 are aligned with the heat sink fins 115. This positioning is important because at least some of the components 113 generate substantial heat, as do the light modules 125. Removal of as much of this heat as possible is critical for prolonging the useful life of the components 113 and the light modules 125, for improving the reliability of the light fixture 100, for reducing maintenance requirements, and for reducing safety hazards.

The parallel heat sink fins 115 can also be used to more efficiently and effectively dissipate heat generated by the components 113 and/or the light modules 125. By orienting the housing 110 rotationally around an axis formed by the height of the housing 110, the parallel heat sink fins 115 can be positioned in such a way as to avoid any potential obstructions (e.g., a wall, a post) and maximize the flow of ambient air therethrough. One way to rotationally orient the housing 110 is by using the collar 150 in conjunction with the cover 130.

The cover 130 of the light fixture 100 is disposed on top of the housing 110. The cover 130 can be called by any of a number of other names in the art, including but not limited to a top hat. The cover 130 can have one or more of a number of features. For example, as shown in FIGS. 1A-1I, the cover 150 can have one or more walls. In this case, the cover 150 has a top wall and a side wall, where the top wall is substantially planar, and where the side wall forms a cylinder that is perpendicular to the top wall.

Another feature of the cover 130 can be one or more coupling features for coupling the cover 130 to a structure. Examples of a structure can include, but are not limited to, a ceiling, a wall, a pole, conduit, a rail, a beam, a piece of wood, and a lattice. In this case, such coupling features can include the aperture through the top wall and the forked protrusions that extend laterally away from substantially opposing edges of the top wall of the cover 130. Such coupling features can be coupled directly or indirectly to a structure.

The cover 130 can also include one or more coupling features that allow the cover to couple to the collar 150. For example, in this case, the cover 130 includes coupling feature 135 and coupling feature 138. Coupling feature 135 in this case extends from the side wall toward the bottom of the side wall (opposite the top of the side wall where the side wall meets the top wall). Specifically, coupling feature 135 has a body that protrudes away and downward from the side wall of the cover 130. The distal end of the body of the coupling feature 135 has a hook, which is used to engage the coupling feature 176 (discussed below) of the collar 150.

Coupling feature 138 in this case also extends from the side wall of the cover 130 toward the bottom of the side wall (substantially opposite from coupling feature 135 along the side wall of the cover 130). Specifically, coupling feature 138 has a body that protrudes away from the side wall of the cover 130 and has an aperture that traverses therethrough. In this example, the aperture of the coupling feature 138 receives a fastening device, which also traverses an aperture in coupling feature 156 (described below) of the collar 150. The configuration and orientation of coupling feature 135 and coupling feature 138 of the cover 130 allows the cover 130 to be hingedly coupled to the collar 150 (using coupling feature 135) and to retain the cover 130 in a closed position relative to the housing 110 when coupling feature 138 is engaged (coupled to coupling feature 156 of the collar 150).

The cover 130 can also include one or more features that are used to couple to (e.g., abut against, form a seal with) the housing 110. For example, the perimeter of the bottom of the side wall of the cover can have a mating protrusion disposed thereon. Such a mating protrusion can have a width and shape (when viewed from below) that is identical to the shape of the top of the housing 110. In certain example embodiments, there can be a sealing member (e.g., a gasket) disposed between the cover 130 and the housing 110 when the cover 130 is coupled to the collar 150. Alternatively, when the cover 130 is coupled to the collar 150, the cover 130 can make direct contact with the housing 110.

The collar 150, as shown in FIGS. 1A-1I, has a body (e.g., a wall) that has an inner surface and a top surface. The body of the collar 150 can be one piece or can be made of multiple pieces. For example, in this case, the body of the collar 150 is made of two pieces that are coupled to each other. In such a case, each piece of the collar 150 can have one or more coupling features (e.g., hinges, extensions with apertures) that allow one piece of the collar 150 to couple to an adjacent piece of the collar 150. These coupling features of the collar 150 can be fixedly coupled, movably coupled, removably coupled, and/or coupled in some other way. When viewed from above, the collar can have any shape, including but not limited to circular (as in this example), oval, square, octagonal, and rectangular.

As discussed above, the collar 150 can have one or more coupling features that couple to corresponding coupling features of the cover 130. For example, in this case, the collar 150 includes coupling feature 176, which is configured to couple to coupling feature 135 of the cover 130. Coupling feature 176 in this example has two protrusions that are parallel with each other and extend away from the outer surface of the body of the collar 150. Disposed between the two protrusions of the collar 150 is a linear segment, around which the hook of coupling feature 135 of the cover 130 is disposed to allow for rotational movement of the coupling feature 135 of the cover 130 relative to the linear segment 178 of the coupling feature 176 of the collar 150.

As another example, in this case, the collar 150 includes coupling feature 156, which is configured to couple to coupling feature 135 of the cover 130. Coupling feature 156 in this example is a lateral extension to extend along the top of the outer surface of wall 152 of the collar 150. The lateral extension of the coupling feature 156 of the collar 150 has an aperture that traverses therethrough, as for receiving a fastening device (e.g., a screw, a bolt). The lateral extension of coupling feature 156 of the collar 150 abuts against (or comes close to abutting against) the body of the coupling feature 138 of the cover 130, and when this occurs the aperture that traverses the lateral extension of coupling feature 156 of the collar 150 is substantially aligned with the aperture that traverses the body of the coupling feature 138 of the cover 130.

This configuration of coupling feature 135 of the cover 130, coupling feature 138 of the cover 130, coupling feature 156 of the collar 150, and coupling feature 176 of the collar 150 in this case provide an example of how the collar 150 and the cover 130 can be coupled to each other. The housing 110 can easily be rotated relative to the collar 150 and/or the cover 130 can be opened relative to the housing 110 (thereby allowing access to the components 113 disposed within the cavity 112 of the housing 110) by decoupling coupling feature 156 of the collar 150 and coupling feature 138 of the cover 130 from each other, and then lifting the cover 130 away from the collar 150 and the housing 110 using the hinge formed by coupling feature 135 of the cover 130 and coupling feature 176 of the collar 150. Reversing this process can allow the rotational position of the housing 110 relative to the collar 150 to be fixed and/or to allow the cover 130 to apply a compressive force against (and so create a proper seal with) the housing 110. In some cases, the top of the housing 110 can have one or more features (e.g., a protruding lip) that retain the collar 150.

As discussed above, one or more of the various components 113 disposed within the cavity 112 of the housing 110 can generate substantial amounts of heat when operating. Part of the purpose of the housing 110 is to use the thermally conductive properties of the walls 111 to dissipate this heat from within the cavity 112 to the ambient environment. Example embodiments increase the effectiveness of the thermally conductive properties of the walls 111 of the housing 110 by putting a maximum amount of surface area of the heat-generating components 113 in direct contact with the wall 111 of the housing 110.

One example of how this can be accomplished is shown in FIGS. 1A-1I. Specifically, each component 113 is mounted on a thermally-conductive platform 114 (e.g., a plate), where the maximum surface area of the component 113 is in direct contact with one side of the thermally-conductive platform 114. The thermally-conductive platform 114 can be wider and/or taller than the component 113, so that the thermally-conductive platform 114 extends beyond all sides of the component 113 when the two are viewed from above. The component 113 and the thermally-conductive platform 114 can include one or more coupling features to allow the component 113 and the thermally-conductive platform 114 to be coupled to each other.

In addition, the walls 111 of the housing 110 that form the cavity 112 can include one or more features for receiving the thermally-conductive platform 114. In this example, the walls 111 of the housing 110 that form the cavity 112 have a number of component positioning features 118. Each component positioning feature 118 in this case includes two coupling features 119 (in this case, slots) at either side of the component positioning feature 118. Each coupling feature 119 of a component positioning feature 118 is shaped and sized to receive an edge of the thermally-conductive platform 114, so that the thermally-conductive platform 114 can slide into and out of the component positioning feature 118. In some cases, as shown in FIG. 1I, coupling features 119 for adjacent component positioning features 118 can be positioned in a dovetail or other similar configuration by sharing some of the same components (e.g., the same base or stem).

The wall 111 of the housing 110 disposed between the coupling features 119 of a component positioning feature 118 can be shaped to make maximum contact with the thermally-conductive platform 114. For example, in this case, the wall 111 of each component positioning feature 118 is planar to complement the planar thermally-conductive platform 114. As another example, if the thermally-conductive platform 114 is V-shaped to make direct contact with two adjacent sides of the component 113, then the walls 111 of the corresponding component positioning feature 118 can be V-shaped with the same angle and dimensions for each side of the V. As yet another example, if the thermally-conductive platform 114 is U-shaped to make direct contact with three adjacent sides of the component 113, then the walls 111 of the corresponding component positioning feature 118 can be U-shaped with the same angle and dimensions for each side of the U. The latter two examples can be utilized when the component is encapsulated or otherwise contained.

Figure 8:
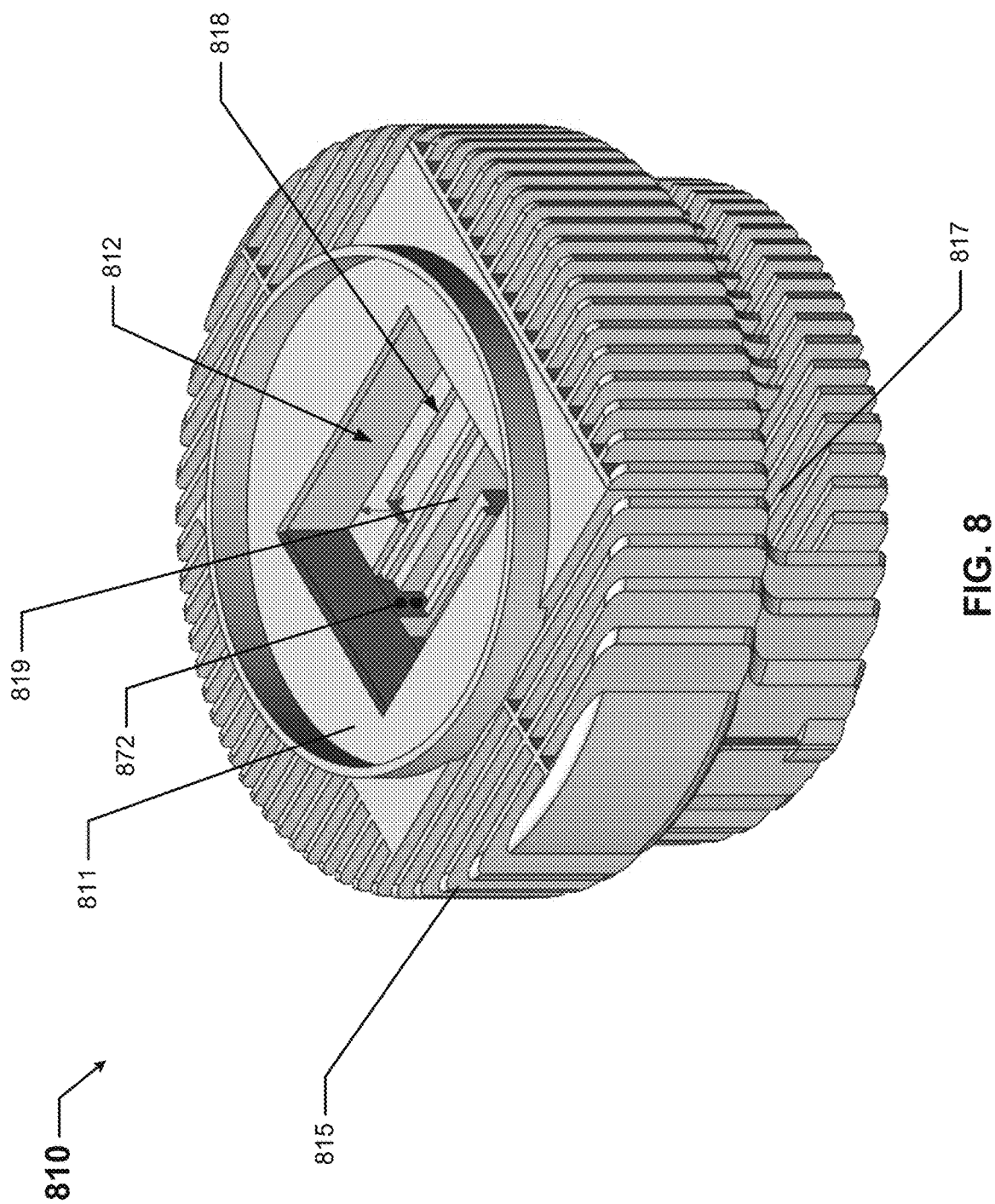
FIG. 8 shows yet another housing for a light fixture in accordance with certain example embodiments.
Figure 9A:
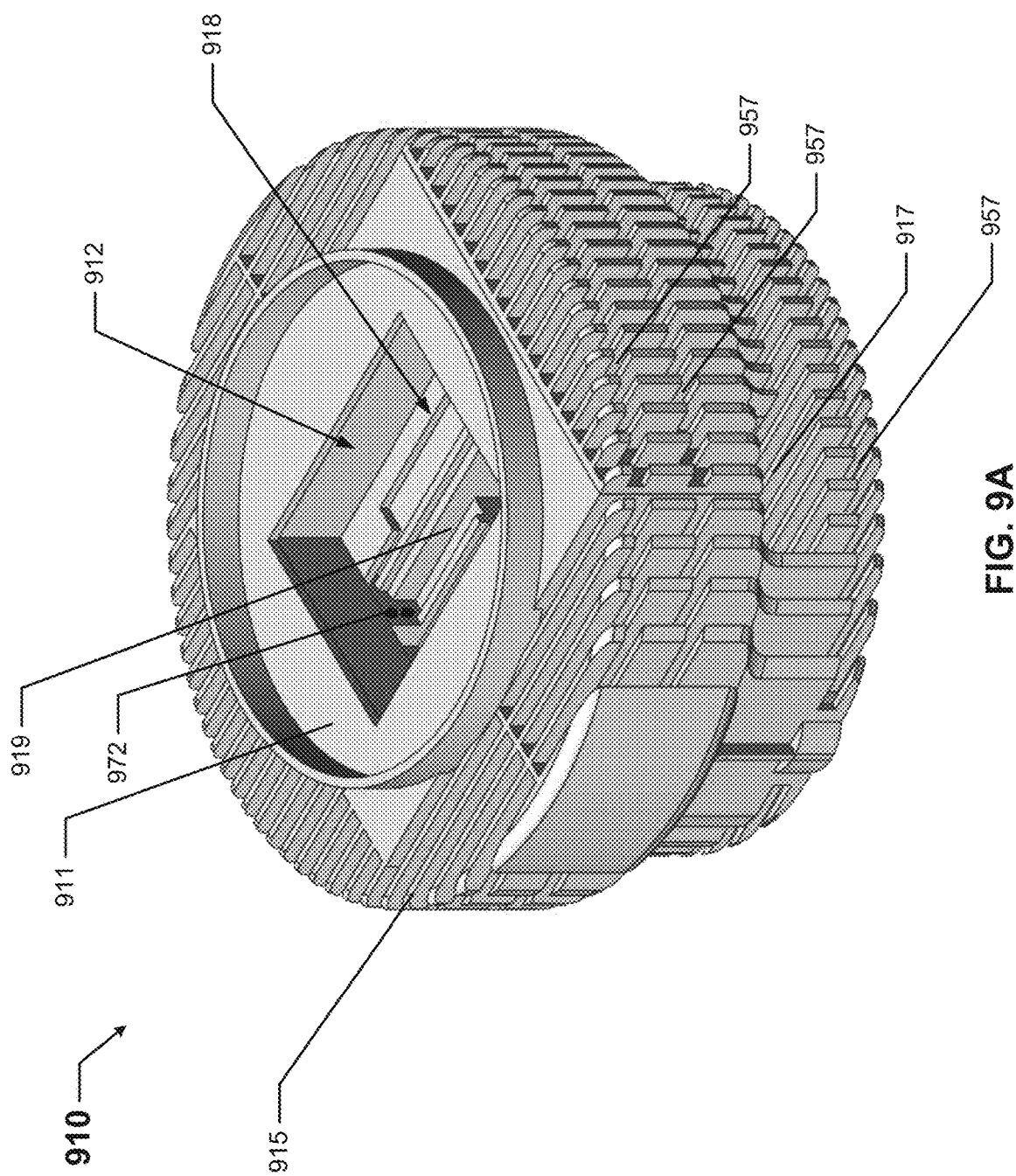

In certain example embodiments, a component positioning feature 118 can include one or more electrical coupling features (e.g., a connector end, a terminal block, one or more electrical conductors) that allow the component 113 that is disposed in the component positioning feature 118 to be electrically coupled to one or more other components 113 and/or the light modules 125. In some cases, the electrical coupling feature of the component positioning feature 118 can engage and disengage merely by inserting and removing the component 113 relative to the component positioning feature 118. An example of such an electrical coupling feature is shown in FIGS. 8 and 9A below.

FIGS. 2A and 2B show a housing 210 for a light fixture in accordance with certain example embodiments. Specifically, FIG. 2A shows a top-front perspective view of the housing 210, and FIG. 2B shows a cross-sectional side view of the housing 210. Referring to FIGS. 1A-2B, the housing 210 of FIGS. 2A and 2B is substantially similar to the housing 110 of FIGS. 1A-1I above, except as described below. For example, the housing 210 of FIGS. 2A and 2B includes a number of component positioning features 218 disposed along the walls 211 that form the cavity 212 within the housing 210. Each component positioning feature 218 is bounded by a pair of coupling features 219. In this case, the component positioning features 218 only traverse approximately the top half of the cavity 212 (as opposed to the entire height of the cavity 212).

The housing 210 has heat sink fins 215 that extend away from the outer surface of the walls 211. In this case, while the heat sink fins 215 are parallel with respect to each other, they are oriented along the width of the housing 210 (as opposed to the height, as in FIGS. 1A-1I). Also, the housing 210 of FIGS. 2A and 2B do not have any air throughways. Further, there is no wireway disposed in the housing 210, and so the light modules and the components are all in physical communication with each other within the cavity 212.

Figure 3:
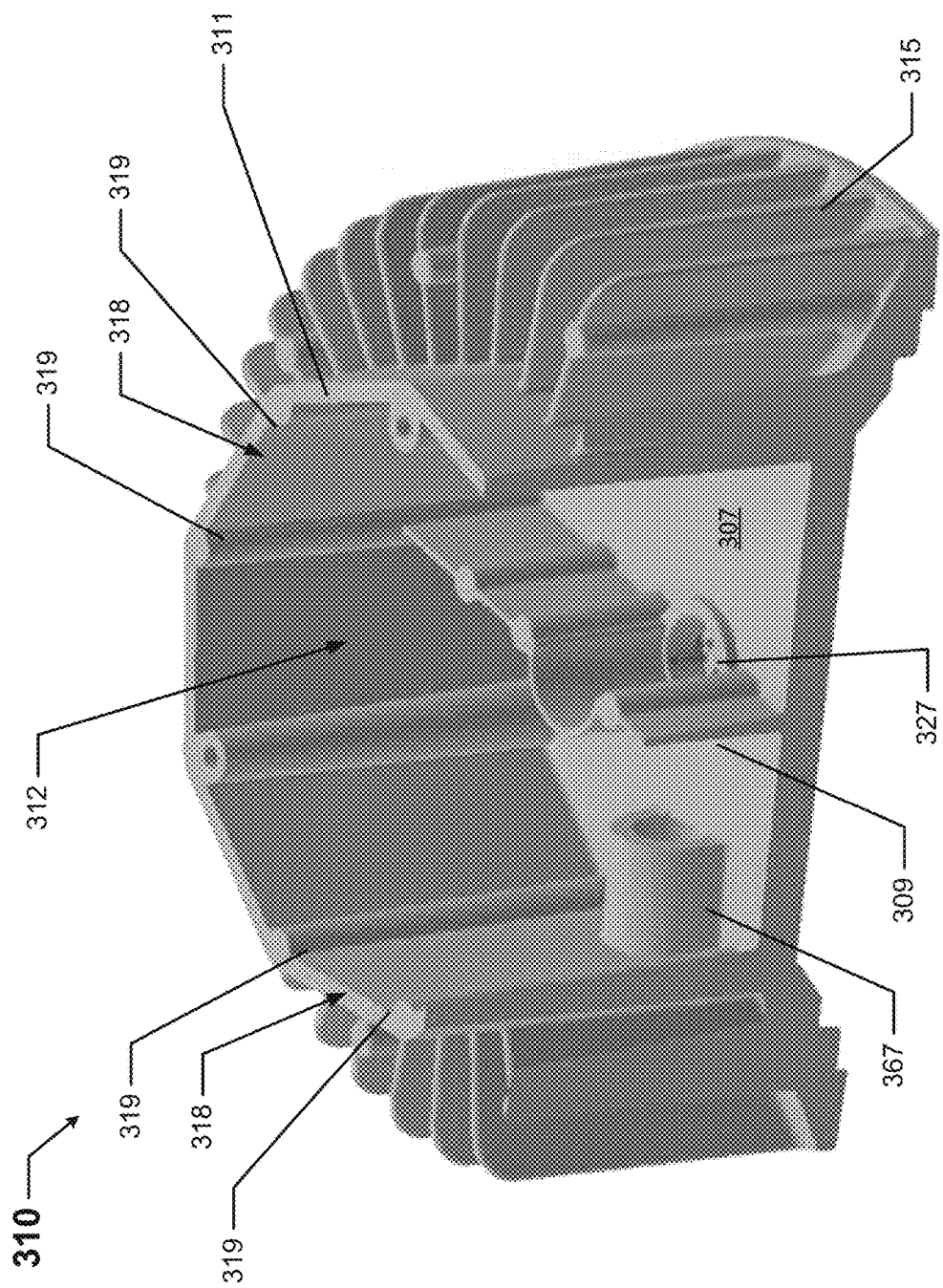
FIG. 3 shows another housing for a light fixture in accordance with certain example embodiments.

FIG. 3 shows a top-side-front cross-sectional perspective view of another housing 310 for a light fixture in accordance with certain example embodiments. Referring to FIGS. 1A-3, the housing 310 of FIG. 3 has heat sink fins 315 that extend radially away from the outer surface of the walls 311 of the housing 310, and so the heat sink fins 315 are not oriented parallel with respect to each other. The housing 310 of FIG. 3 includes a number of component positioning features 318 disposed along the walls 311 that form the cavity 312 within the housing 310. Each component positioning feature 318 is bounded by a pair of coupling features 319. In this case, the component positioning features 318 traverse the entire height of the cavity 312.

The housing 310 of FIG. 3 also includes a dividing wall 309 that extends upward from the bottom surface 307 of the cavity 312. The dividing wall 309 can be used to provide a barrier that can be used for thermal separation, electrical separation (high voltage versus control/signal voltage), for placement of one or more particular components within the cavity, and/or for some other reason. When used for thermal separation, the dividing wall 209 can be made of a thermally-insulating material. When used for electrical separation, the dividing wall 309 can be made of an electrically-insulating material.

For example, electrical conductors can be disposed through the wireway 327 and carry relatively high voltage power from a power supply (a component disposed within the cavity 312) to light modules that are disposed on the other side of the wireway 327. In such a case, the power supply can be disposed on the same side of the dividing wall 309 as the wireway 327. On the other side of the dividing wall 309 can be other electrical conductors disposed through the channel 367 leading to an externally-mounted sensor module that uses low voltage and that could be adversely affected by the higher voltage power of the power supply. The dividing wall 309 allows these components to operate without being adversely affected by each other.

The dividing wall 309 can have any shape, size (e.g., height, thickness), and configuration sufficient to provide the intrinsic barrier required to comply with applicable safety standards, while also still allowing enough room within the cavity 312 for any other components (e.g., controller, power supply, energy storage device) of the light fixture that are disposed within the cavity 312.

Figure 4A:
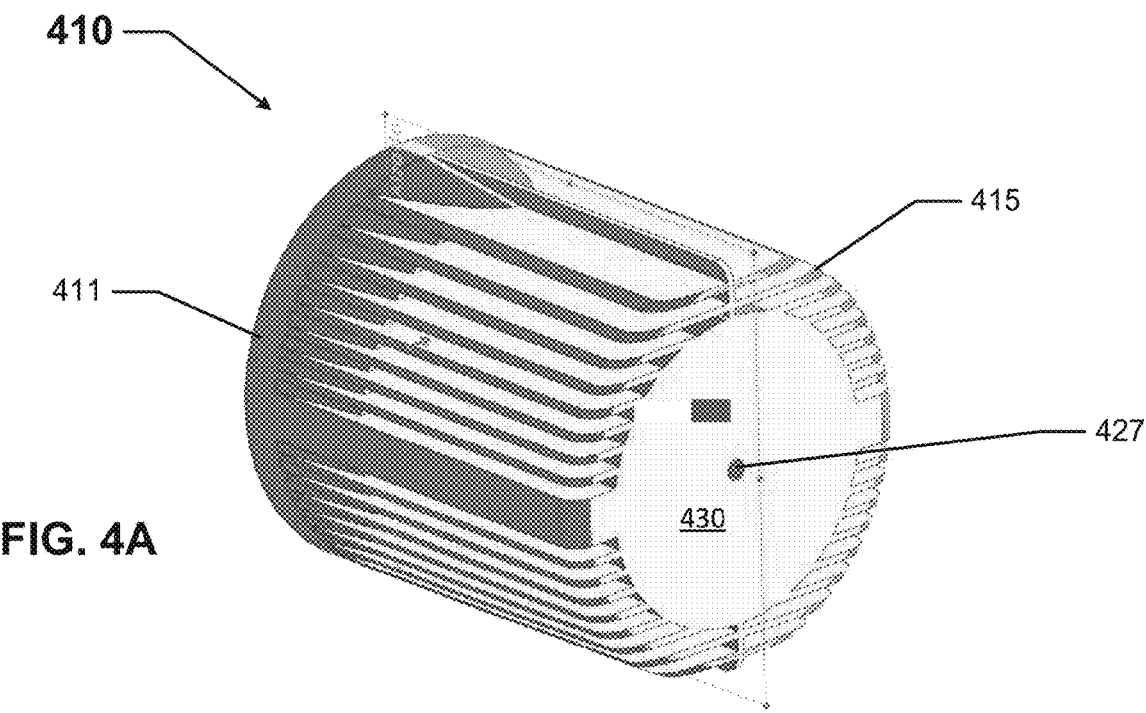
FIGS. 4A-4C show still another housing for a light fixture in accordance with certain example embodiments.
Figure 4B:
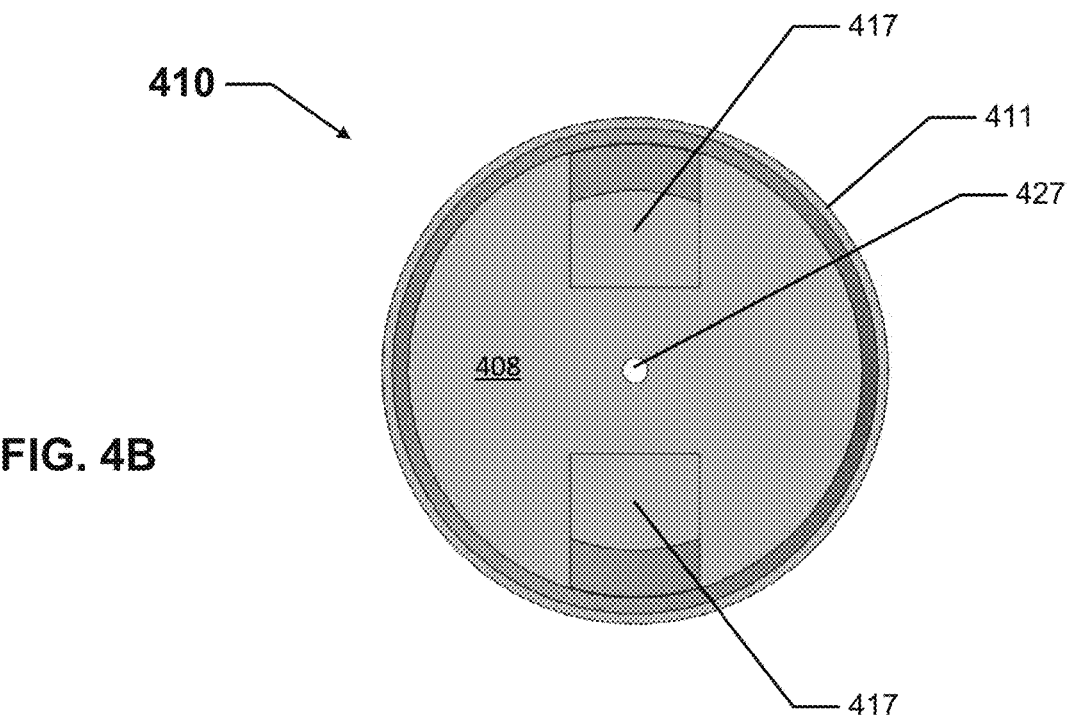
Figure 4C:
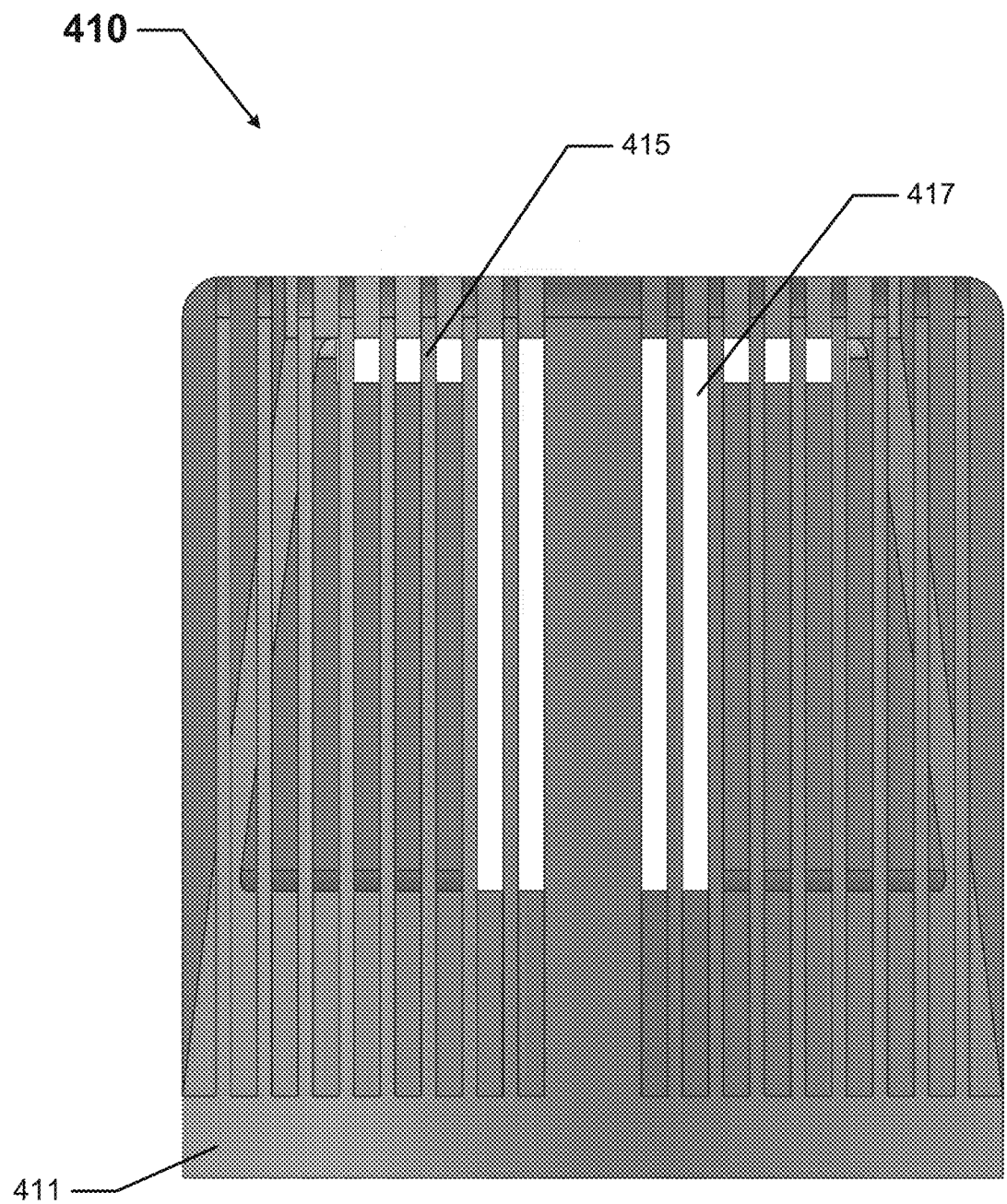

FIGS. 4A-4C show still another housing 410 for a light fixture in accordance with certain example embodiments. Specifically, FIG. 4A shows a top-front-side perspective view of the housing 410. FIG. 4B shows a bottom view of the housing 410. FIG. 4C shows a side view of the housing 410. Referring to FIGS. 1A-4C, the housing 410 of FIGS. 4A-4C is substantially the same as the housing 110 of FIGS. 1A-1I, except as described below. For example, the housing 410 of FIGS. 4A-4C includes a number of heat sink fins 415 that extend away from the outer surface of the walls 411. In this case, the heat sink fins 415 are parallel with respect to each other, and they are oriented along the height of the housing 410.

Also, there are a number of air throughways 417 along the upper ⅔ of the housing 110 that are aligned with the heat sink fins 115. There is also a wireway 427 that connects the cavity that houses the components to the bottom surface 408 (more generally called a light source housing portion) of the housing where the light modules are disposed. The housing 410 generally has a cylindrical shape in this case.

Figures 5A, 5B:
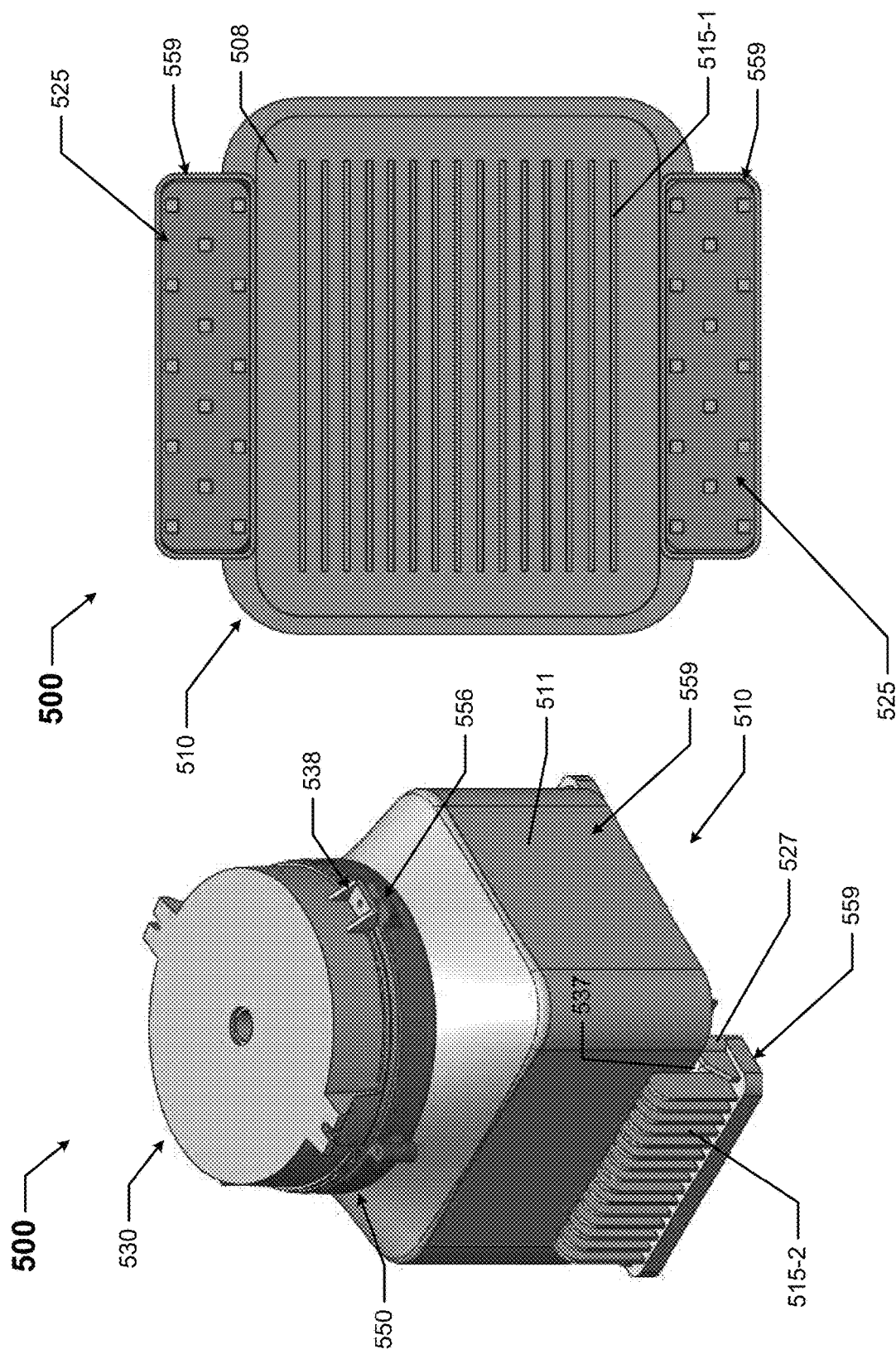

FIGS. 5A-5D show another light fixture 500 in accordance with certain example embodiments. Specifically, FIG. 5A shows a top-front-side perspective view of the light fixture 500. FIG. 5B shows a bottom view of the light fixture 500. FIG. 5C shows a front view of the light fixture 500. FIG. 5D shows a side view of the light fixture 500. Referring to FIGS. 1A-5D, the light fixture 500 of FIGS. 5A-5D and its components are substantially similar to the light fixture 100 of FIGS. 1A-1I and its components, except as described below.

For example, the light fixture 500 of FIGS. 5A-5D includes a housing 510, a cover 530, and a collar 550. As with the collar 150 of FIGS. 1A-1I, the collar 550 of FIGS. 5A-5D is disposed around the upper end of the housing 510 and includes coupling feature 556 and coupling feature 576. Also, as with the cover 130 of FIGS. 1A-1I, the cover 530 of FIGS. 5A-5D is disposed atop the housing 510 and includes coupling feature 535 and coupling feature 538 for coupling to the collar 550.

While the top portion of the housing 510 is circular when viewed from above, the bottom portion of the housing 510 is square when viewed from below. While the housing 510 has heat sink fins 515-1, in this case the heat sink fins 515-1 are not disposed on the side walls 511 of the housing 510. Instead, the bottom surface 508 of the housing has heat sink fins 515-1 extending downward away from the bottom surface 508. In this example, the heat sink fins 515-1 are planar and aligned in parallel with each other and with the two sets of light modules 525.

Rather than being coupled to the bottom surface 508 of housing 510, and rather than being concentrated in a single area, the light fixture 500 of FIGS. 5A-5D have two sets of light modules 525 that are horizontally offset from the housing 510. The two sets of light modules 525 are substantially the same shape and size as each other. One set of light modules 525 in this case is positioned along one side of the housing, slightly below the bottom surface 508 of the housing 510. The other set of light modules 525 in this case is positioned along an opposing side of the housing 510, also slightly below the bottom surface 508 of the housing 510.

Each set of light modules 525 has a wireway 527 that allows electrical conductors to pass from the cavity formed by the walls 511 of the housing 510 to the respective set of light modules 525. Each set of light modules 525 can, as in this example, have its own housing 559 (more generally called a light source housing portion). Also, extending from the top of each housing 559 of a set of light modules 525 are heat sink fins 515-2. In this case, the heat sink fins 515-2 for each set of light modules 525 extend away from the top of the local housing 559 for each set of light modules 525. In this example, the heat sink fins 515-2 are planar and aligned in parallel with each other and perpendicular with the heat sink fins 515-1.

While the housing 510 in this example does not have any air throughways that pass therethrough, there is an air throughway 517 between the housing 510 and each of the sets of light modules 525, allowing air to flow around the wireways 527. The air throughway 517 is formed independent of the heat sink fins 505. The air throughway 517 is between both the heat sink fins 515-2 and the housing 510 as well as the housing 559 for each set of light modules 525 and the housing 510. These air throughway 517 can allow for improved natural air flow around the heat sink fins 515-2, the housings 559 for the sets of light modules 525, the heat sink fins 515-1, the wireways 527, and the housing 510, resulting in more efficient heat dissipation. While not shown, the components disposed within the cavity of the housing 510 can be arranged within the cavity in a manner similar to the arrangement of the components 113 disposed in the cavity 112 of the housing 110 of FIGS. 1A-1I.

Figure 6A:
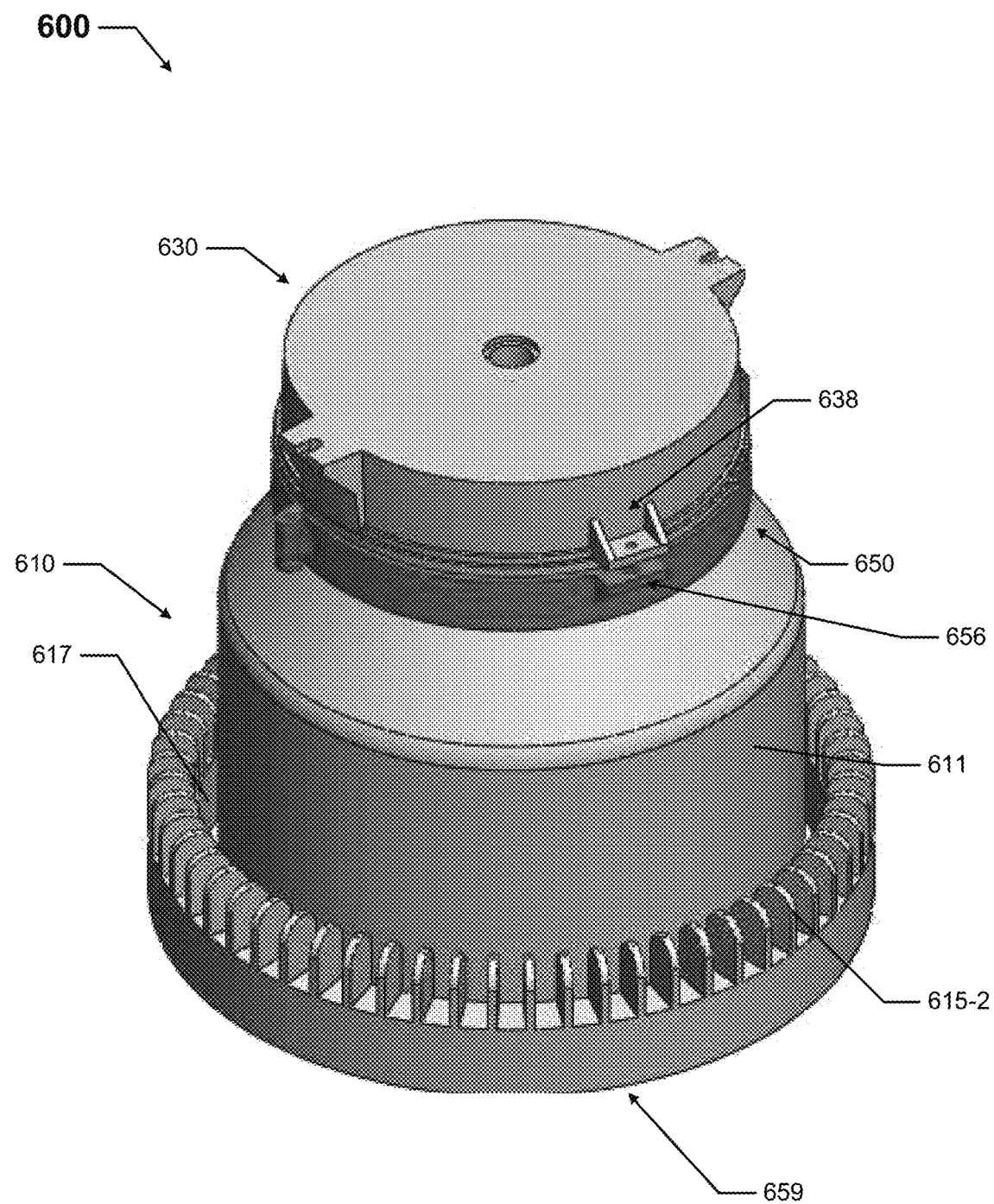
FIGS. 6A-6D show yet another light fixture in accordance with certain example embodiments.
Figure 6B:
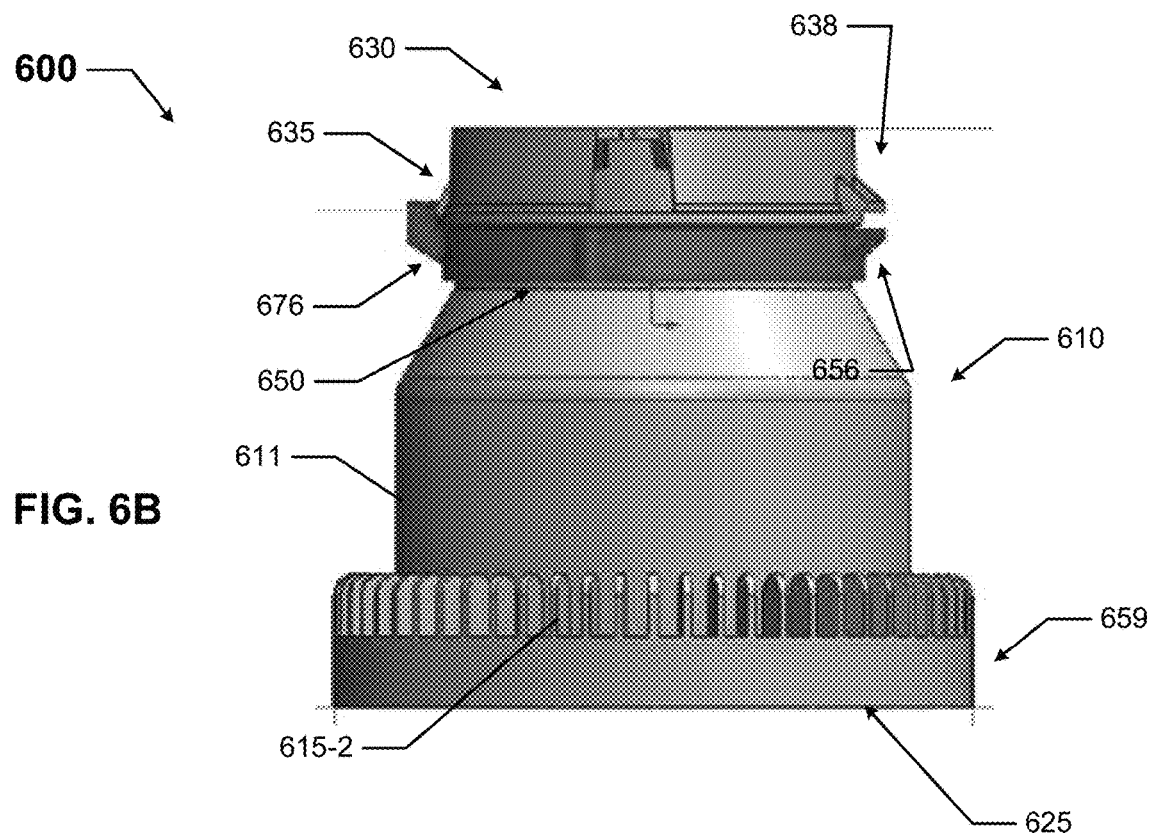
Figure 6C:
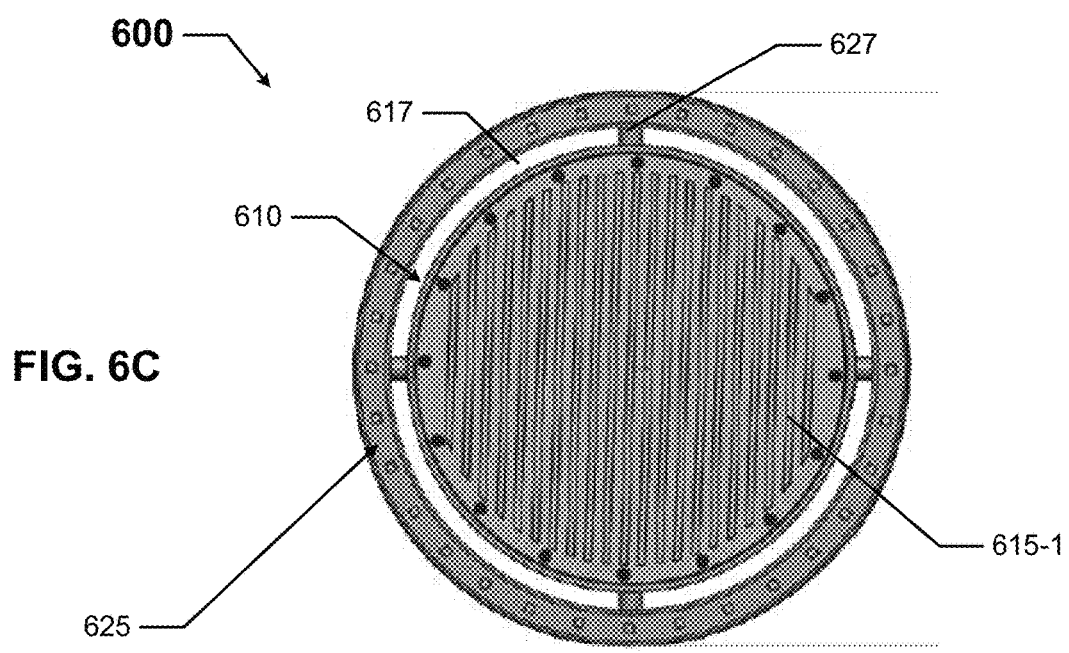
Figure 6D:
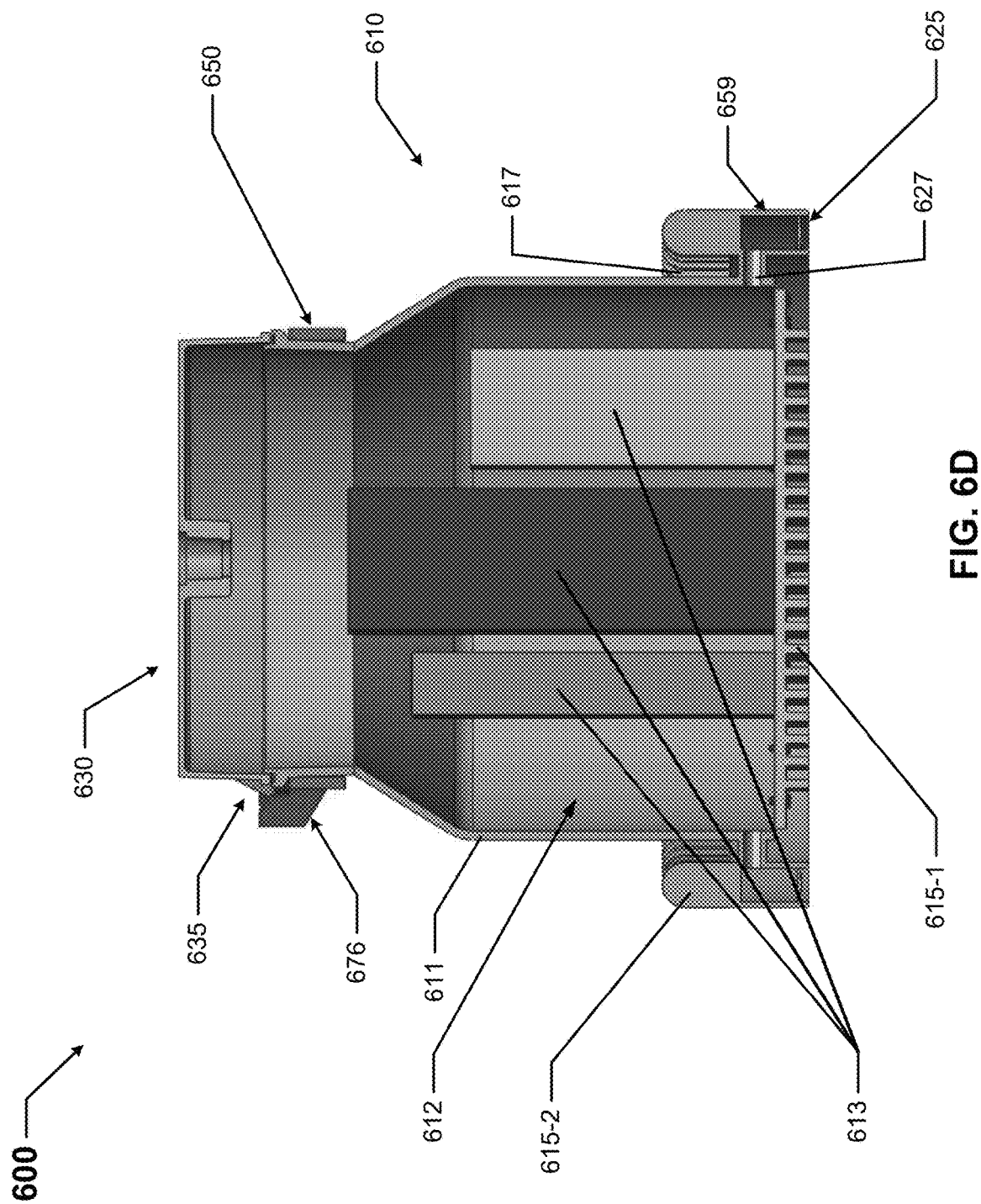

FIGS. 6A-6D show yet another light fixture in accordance with certain example embodiments. Specifically, FIG. 6A shows a top-front-side perspective view of the light fixture 600. FIG. 6B shows a side view of the light fixture 600. FIG. 6C shows a bottom view of the light fixture 600. FIG. 6D shows a cross-sectional side view of the light fixture 600. Referring to FIGS. 1A-6D, the light fixture 600 of FIGS. 6A-6D and its components are substantially similar to the light fixture 100 of FIGS. 1A-1I and the light fixture 500 of FIGS. 5A-5D and their components, except as described below.

For example, the light fixture 600 of FIGS. 6A-6D includes a housing 610, a cover 630, and a collar 650. As with the collar 150 of FIGS. 1A-1I, the collar 650 of FIGS. 6A-6D is disposed around the upper end of the housing 610 and includes coupling feature 656 and coupling feature 676. Also, as with the cover 130 of FIGS. 1A-1I, the cover 650 of FIGS. 6A-6D is disposed atop the housing 610 and includes coupling feature 635 and coupling feature 638 for coupling to the collar 650.

The top portion of the housing 610 is circular when viewed from above, and the bottom portion of the housing 610 is also circular (but with a larger radius) when viewed from below. While the housing 610 has heat sink fins 615-1, in this case the heat sink fins 615-1 are not disposed on the side walls 611 of the housing 610. Instead, the bottom surface 608 of the housing has heat sink fins 615-1 extending downward away from the bottom surface 608. In this example, the heat sink fins 615-1 are planar and aligned in parallel with each other.

Rather than being coupled to the bottom surface 608 of housing 610, and rather than being concentrated in a single area, the light fixture 600 of FIGS. 6A-6D has light modules 625 that form a continuous ring around the housing 610. The light modules 625 are positioned substantially planar with the bottom surface 608 of the housing 610. There are one or more wireways 627 that allows electrical conductors to pass from the cavity 612 formed by the walls 611 of the housing 610 to the light modules 625. The light modules 625 can, as in this example, have their own housing 659 (more generally called a light source housing portion). Also, extending from the top of the housing 659 of the light modules 625 are heat sink fins 615-2. In this case, the heat sink fins 615-2 for the light modules 625 extend away from the top of the local housing 659 for the light modules 625. In this example, the heat sink fins 615-2 are planar and radially disposed relative to the housing 610.

While the housing 610 in this example does not have any air throughways that pass therethrough, there is an air throughway 617 between the housing 610 and the light modules 625, allowing air to flow around the wireways 627. The air throughway 617 is formed independent of the heat sink fins 605. The air throughway 617 is between both the heat sink fins 615-2 and the housing 610 as well as the housing 659 for the light modules 625 and the housing 610. These air throughway 617 can allow for improved natural air flow around the heat sink fins 615-2, the housings 659 for the sets of light modules 625, the heat sink fins 615-1, the wireways 627, and the housing 610, resulting in more efficient heat dissipation. Further, the components 613 disposed within the cavity 612 of the housing 610 can be arranged within the cavity 612 in a manner similar to the arrangement of the components 113 disposed in the cavity 112 of the housing 110 of FIGS. 1A-1I.

Figure 7C:
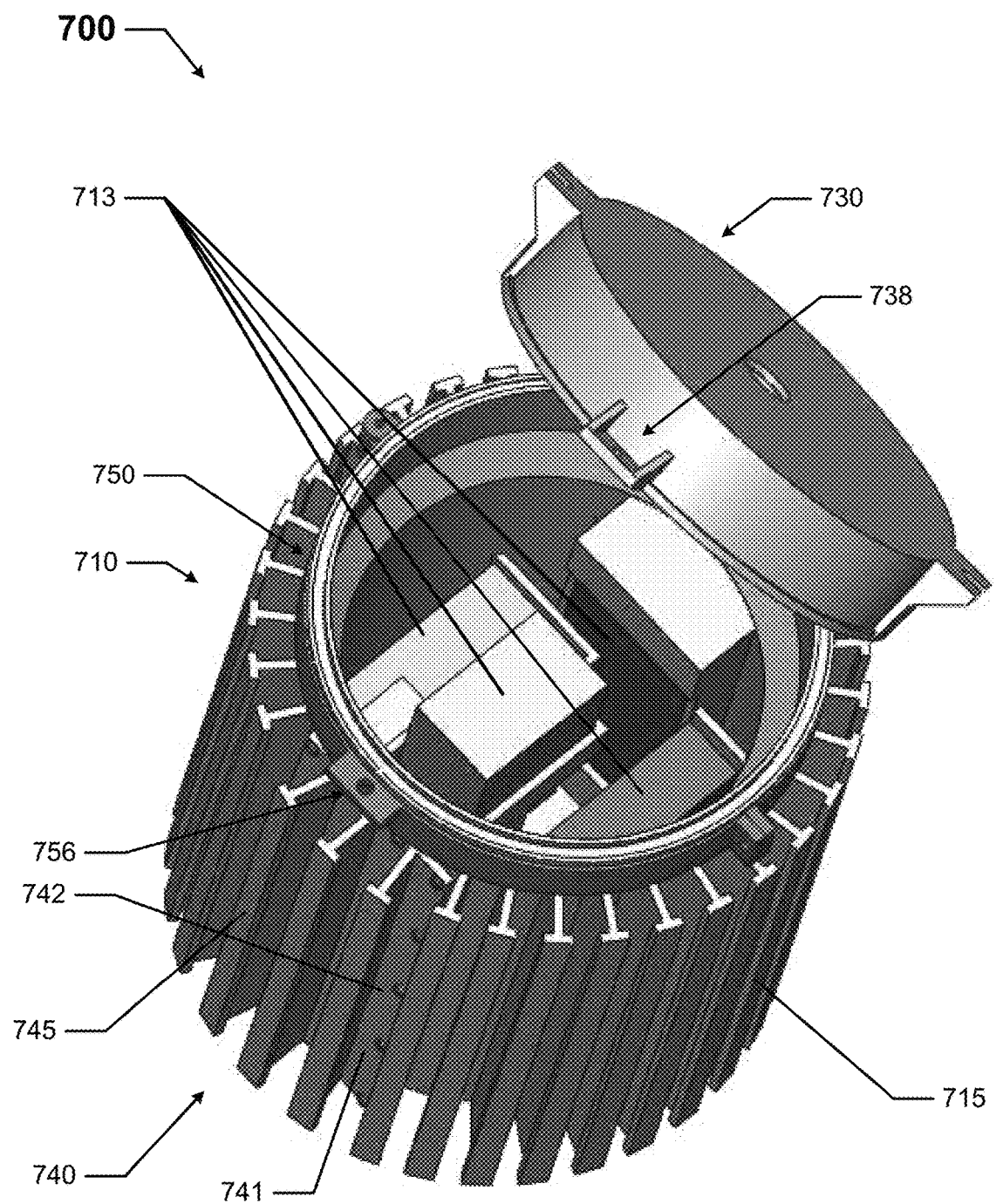
Figure 7D:
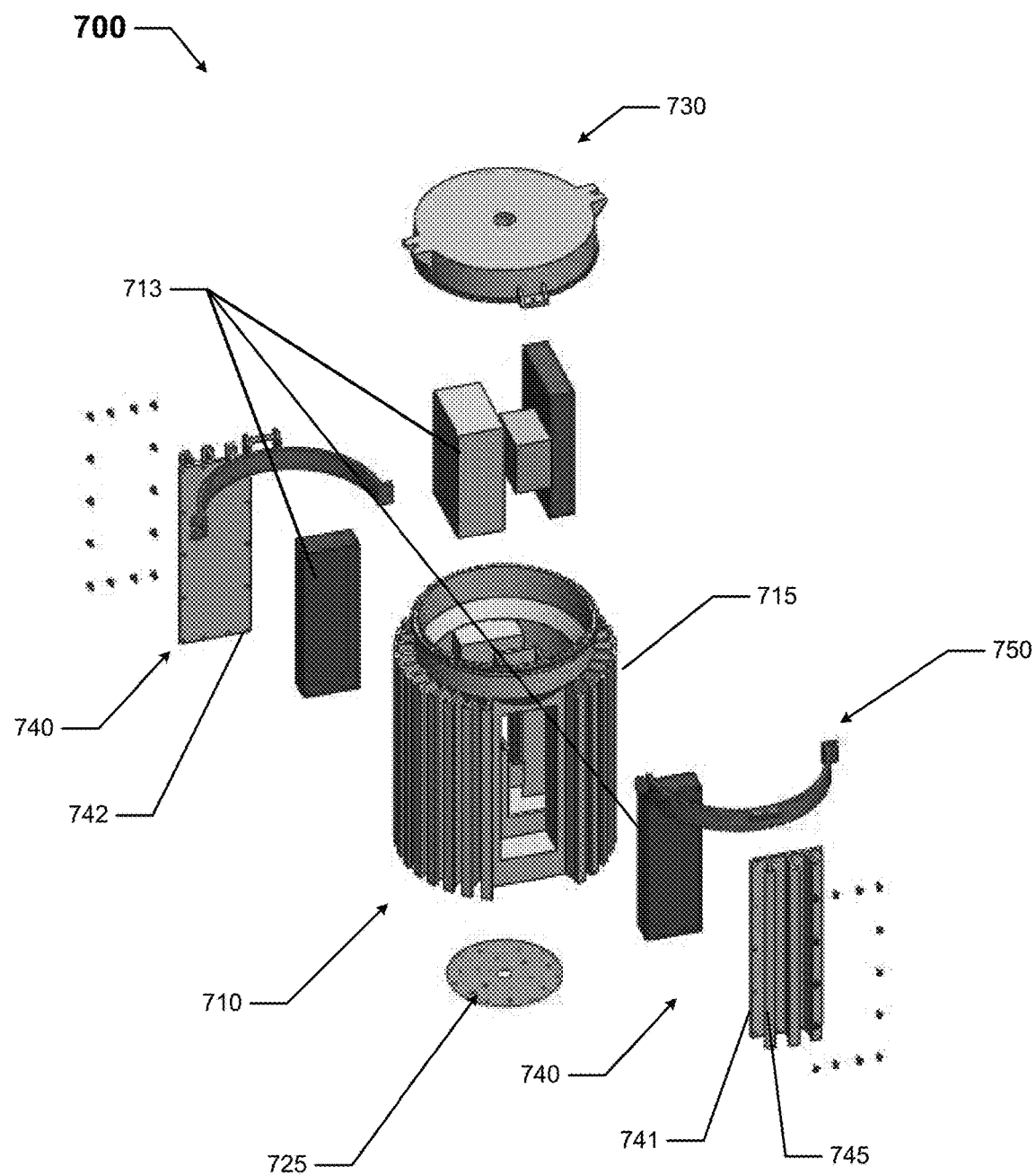

FIGS. 7A-7D show still another light fixture in accordance with certain example embodiments. Specifically, FIG. 7D shows a top-front-side perspective view of the light fixture 700. FIG. 7B shows a bottom view of the light fixture 700. FIG. 7C shows a top-front-side perspective view of the light fixture 700 with the cover 730 open. FIG. 7D shows an exploded top-front-side perspective view of the light fixture 700. Referring to FIGS. 1A-7D, the light fixture 700 of FIGS. 7A-7D and its components are substantially similar to the previously-described light fixtures and their components, except as described below.

For example, the light fixture 700 of FIGS. 7A-7D includes a housing 710, a cover 730, and a collar 750. As with the collar 150 of FIGS. 1A-1I, the collar 750 of FIGS. 7A-7D is disposed around the upper end of the housing 710 and includes coupling feature 756 and coupling feature 776. Also, as with the cover 130 of FIGS. 1A-1I, the cover 750 of FIGS. 7A-7D is disposed atop the housing 710 and includes coupling feature 735 and coupling feature 738 for coupling to the collar 750. Also, the housing 710 is cylindrical in this example, and there are heat sink fins 715 that extend radially away from the outer surface of the side walls 711 of the housing 710.

The housing 710 of FIGS. 7A-7D shows a modular concept that allows for reconfiguration of some of the heat sink fins 715, creation of one or more air throughways, interchange of one or more components 713, and/or any other applicable modification to the light fixture 700. For example, in this case, the housing 710 includes one or more (in this case, two) removable pieces 740. Each removable piece 740 couples to a wall 711 of the housing 710 using one or more coupling features 742 (in this case, apertures in the body 741 of a removable piece 740, corresponding apertures in a wall 711 of the housing 710, and fastening devices that are disposed in each of those apertures in the body 741 of the removable piece 740 and in the wall 711 of the housing 710). A removable piece 740, when coupled to the wall 711 of the housing 710, can cover an opening in the wall 711.

Each removable piece 740 can include one or more of a number of features and/or components. For example, in this case, each removable piece 740 includes heat sink fins 745 that extend radially away from the outer surface of the body 741 of the piece 740. In such a case, the heat sink fins 745 can have the same or different characteristics (e.g., spacing, thickness, shape, length, height) relative to the heat sink fins 715 disposed on the walls 711 of the housing 710. Each removable piece 740 in this example also includes one or more components 713 that are coupled to the inner surface of the body 741 of the piece 740. In such a case, the inner surface of the body 741 of the piece 740 can act as a thermally-conductive platform 114 of a component positioning feature 118, as discussed above with respect to FIGS. 1A-1I.

In certain example embodiments, the removable piece 740 can include a thermal isolator (not shown) that reduces or eliminates heat generated by the one or more components 713 associated with the removable piece 740 from affecting other components 713 within the cavity formed by the walls 711 of the housing 710 and/or without substantially adding to the heat burden of the remainder of the heat sink fins 715. In this way, the removable piece 740 can offer a level of independence in terms of heat dissipation as well as modularity relative to the rest of the housing 710 of the light fixture 700.

Other examples of features and/or components that a removable piece 740 can include, but are not limited to, one or more channels that extend away from the inner surface of the body 741 of the piece 740 (so as to create one or more air throughways), one or more coupling features disposed on the inner and outer surface of the body 741 of the piece 740 (so as to allow for attachment of another component, such as a sensor module), and one or more coupling features (as shown in FIG. 9F below) that allow a removable piece 740 to close off, enlarge, or reduce the size of an air throughway. When the removable piece 740 couples to or includes a component 713, then the housing 710 can include a coupling feature that allows the component 713 to become electrically coupled to the housing 710 (or one or more other components 713 and/or the light modules 725 of the light fixture 700).

In this case, the light modules 725 are disposed on a single circular circuit board that abuts against a bottom surface of the housing 710, similar to what is shown and described with respect to the light fixture 100 of FIGS. 1A-1I. The removable pieces 740 in this example can be removed or added regardless of whether the cover 730 is in an open or closed position relative to the housing 710. When the light fixture 700 is located in a hazardous environment, the removable piece 740, when coupled to a wall 711 of the housing 710, can form a flame path.

FIG. 8 shows yet another housing 810 for a light fixture in accordance with certain example embodiments. Referring to FIGS. 1A-8, the housing 810 of FIG. 8 includes a number of heat sink fins 815 that extend away from the outer surface of the walls 811 of the housing 810, where all of the heat sink fins 815 are parallel to each other. In this case, there is an air passageway 817 toward the bottom of the housing 810 that extends along most of the width of the housing 810.

The cavity 812 formed by the walls 811 of the housing 810 have a number of component positioning features 818. In this case, the component positioning features 818 are laid out horizontally within the cavity 812 (as opposed to vertically for the component positioning features 118 of FIGS. 1A-1I). Each of the component positioning features 818 have one or more coupling features 819 (in this case, recesses and contours) that receive a component of the light fixture, thereby providing improved thermal communication between the wall 811 of the housing 810 and the component. Also, in this case, each component positioning feature 818 of FIG. 8 includes a coupling feature 872 (in this case, a female connector end) that electrically couples the component that is disposed in the component positioning feature 818 to one or more other components and/or the light modules for the light fixture.

Figure 9B:
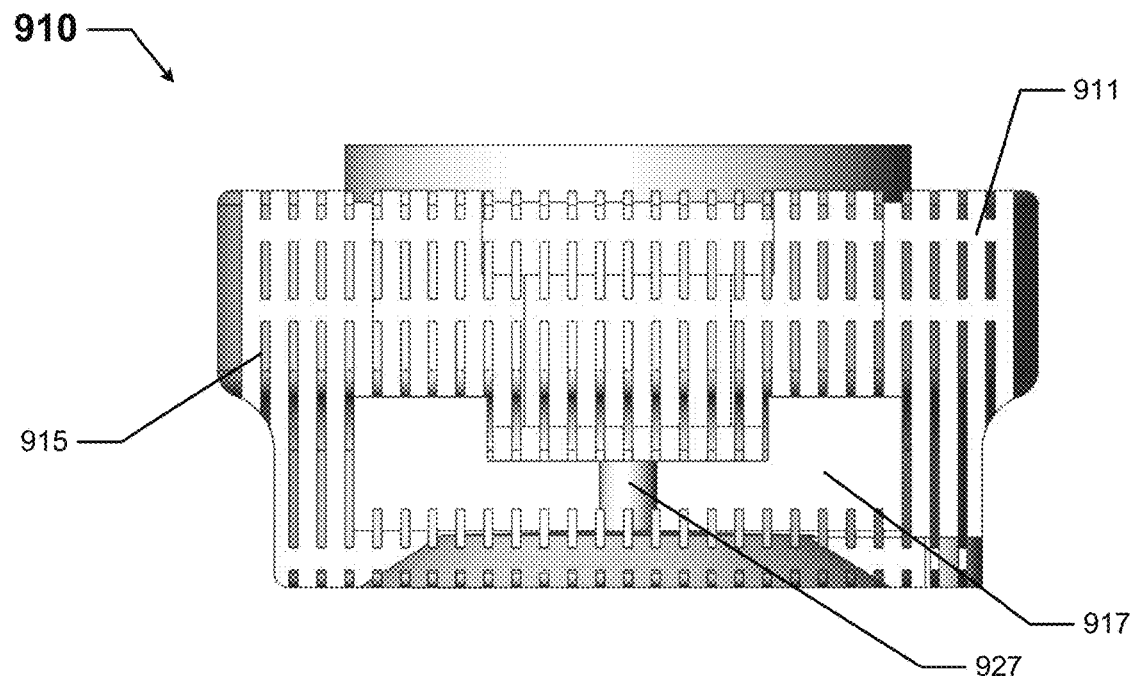
Figure 9C:
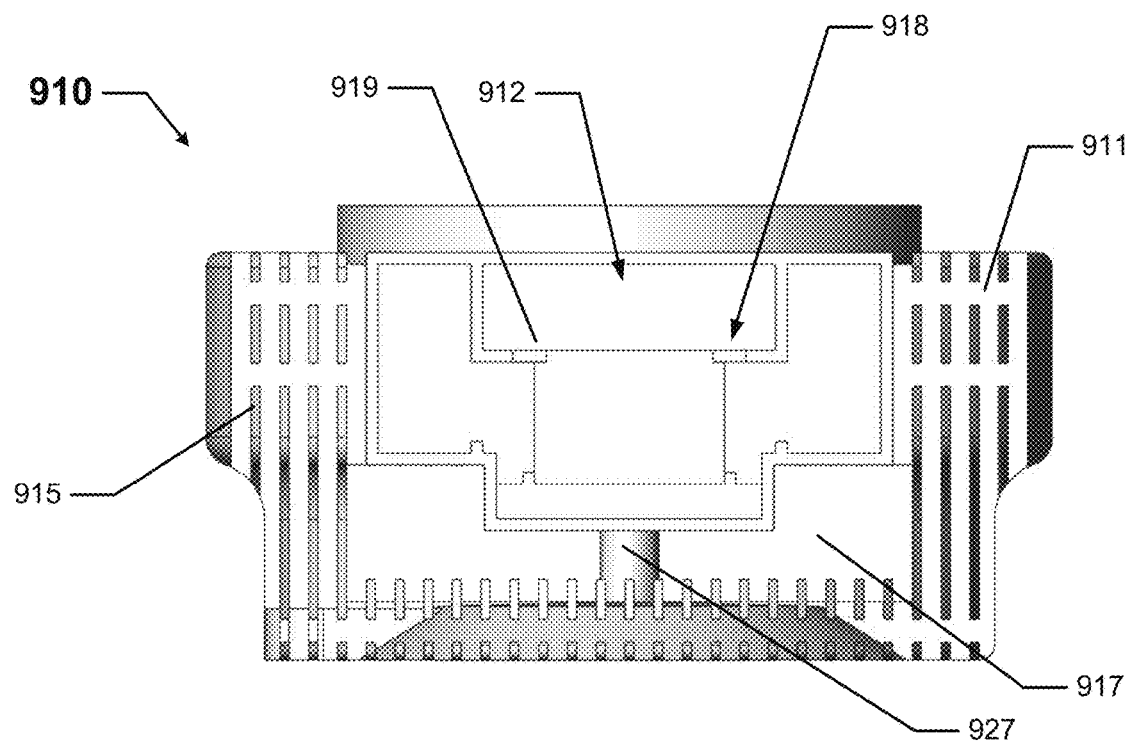
Figure 9D:
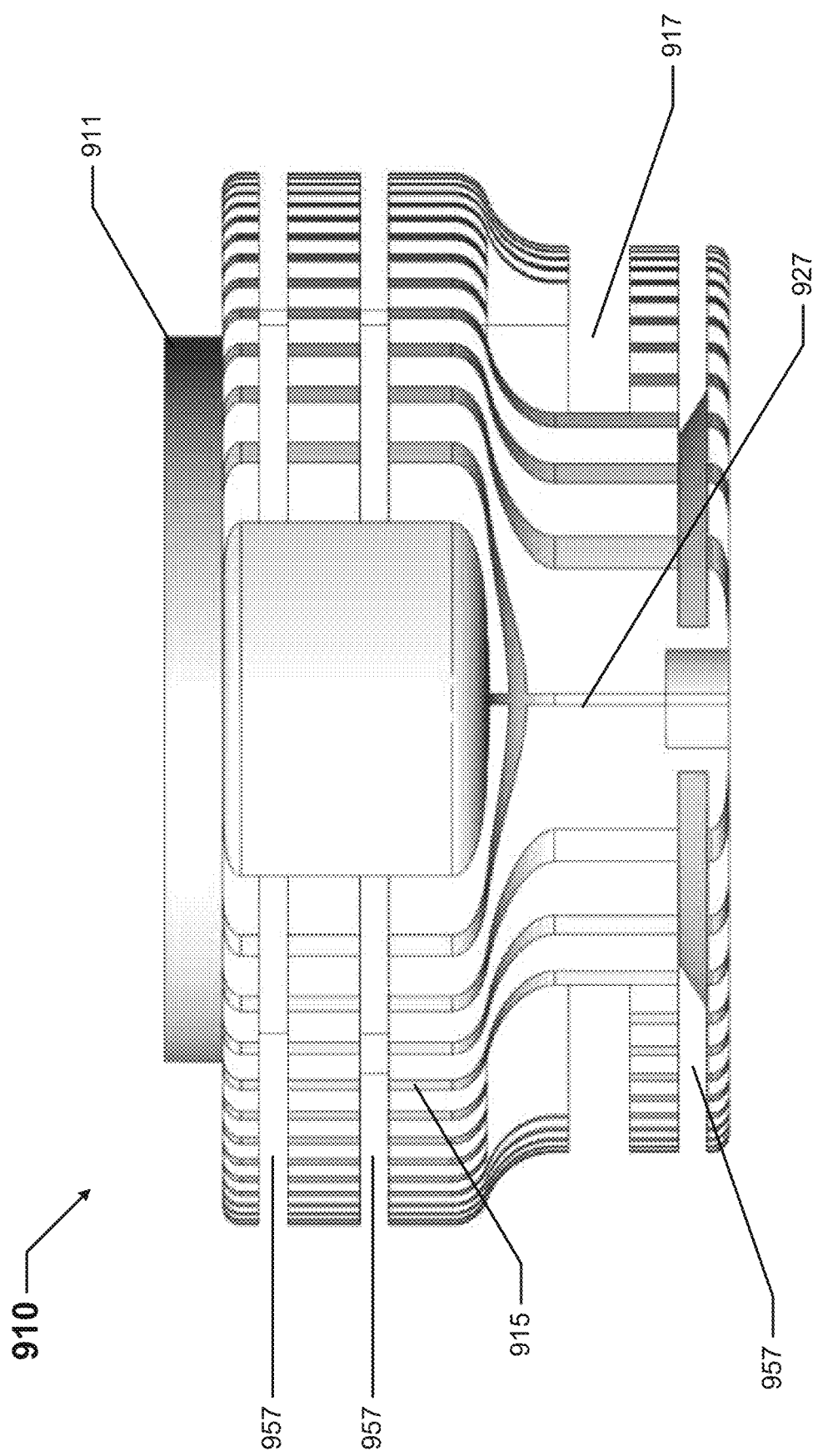

FIGS. 9A-9F show still another housing 910 for a light fixture in accordance with certain example embodiments. Specifically, FIG. 9A shows a top-side-front perspective view of the housing 910. FIG. 9B shows a front view of the housing 910. FIG. 9C shows a cross-sectional front view of the housing 910. FIG. 9D shows a side view of the housing 910. FIG. 9E shows a partial top-side-front perspective view of the housing 910. FIG. 9F shows a modular piece of the housing 910.

Referring to FIGS. 1A-9F, the housing 910 of FIGS. 9A-9F is substantially the same as the housing 810 of FIG. 8, except as described below. For example, the housing 910 of FIGS. 9A-9F includes a number of heat sink fins 915 that extend away from the outer surface of the walls 911 of the housing 910, where all of the heat sink fins 915 are parallel to each other. In this case, there is an air passageway 917 toward the bottom of the housing 910 that extends along most of the width of the housing 910.

Also, the cavity 912 formed by the walls 911 of the housing 910 have a number of component positioning features 918. In this case, the component positioning features 918 are laid out horizontally within the cavity 912 (as opposed to vertically for the component positioning features 118 of FIGS. 1A-1I). Each of the component positioning features 918 have one or more coupling features 919 (in this case, recesses and contours) that receive a component of the light fixture, thereby providing improved thermal communication between the wall 911 of the housing 910 and the component. Also, in this case, each component positioning feature 918 of FIG. 9 includes a coupling feature 972 (in this case, a female connector end) that electrically couples the component that is disposed in the component positioning feature 918 to one or more other components and/or the light modules for the light fixture.

In addition, the heat sink fins 915 of FIGS. 9A-9F have a number (in this case, three) of partial air throughways 957 that run through the heat sink fins 915 but not through the walls 911 of the housing 910. In this case, the partial air throughways 957 are planar and parallel with the air passageway 917. One of the partial air throughways 957 is positioned below the air passageway 917, and the other two partial air throughways 957 are positioned above the air passageway 917.

As discussed above, an example housing can be modular. For instance, the housing 910 of FIGS. 9A-9E can be made of one or more of a number of removable pieces 940 as shown in FIG. 9F. Each removable piece 940 can include any of a number of features 981 (e.g., recesses, protrusions, slots, tabs, detents) that can allow a removable piece 940 to be added to and/or removed from the housing 910. A removable piece can include one or more heat sink fins or, as shown in FIG. 9F, have no heat sink fins. Some or all of the housing 910 can be made of multiple removable pieces 940 that are interconnected with each other. Alternatively, the housing 910 can be largely a single piece that includes a number of discrete removable pieces 940 that are placed at one or more various locations throughout the housing 910. In some cases, a removable piece 940 has a channel disposed therethrough, creating an additional air throughway. When the housing 910 is located in a hazardous environment, the removable piece 940, when coupled to a wall 911 of the housing 910, can form a flame path. A removable piece 940, when coupled to the wall 911 of the housing 910, can cover an opening in the wall 911.

Figure 10A:
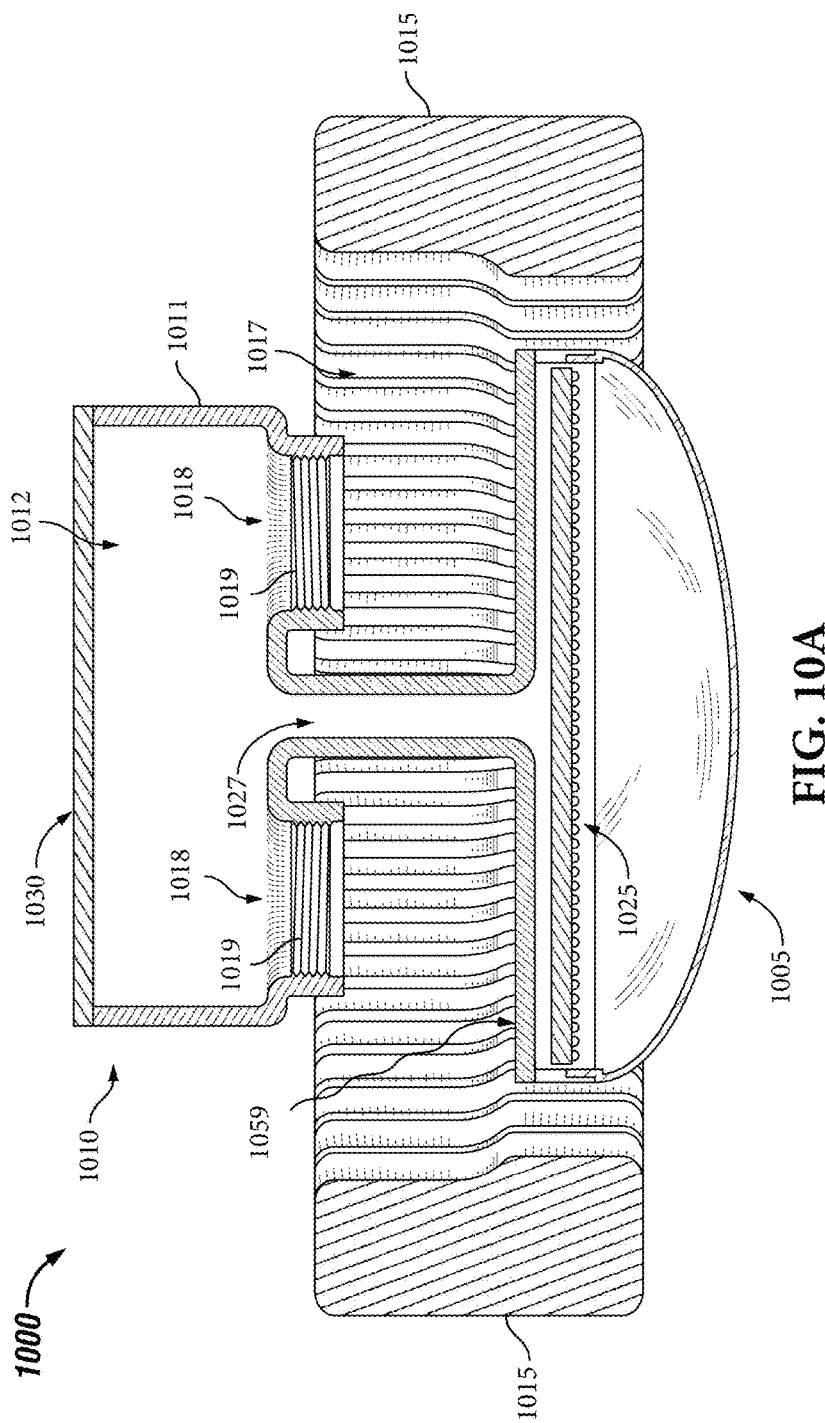
FIGS. 10A-10C show a subassembly of a light fixture in accordance with certain example embodiments.
Figure 10B:
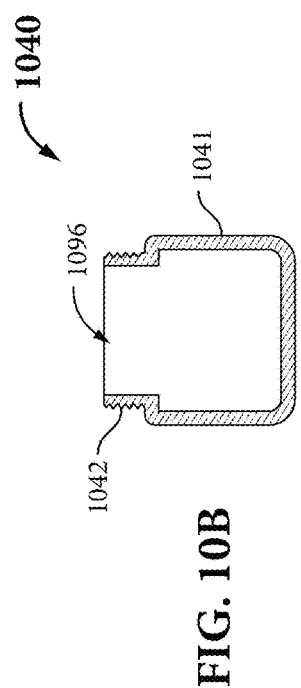
Figure 10C:
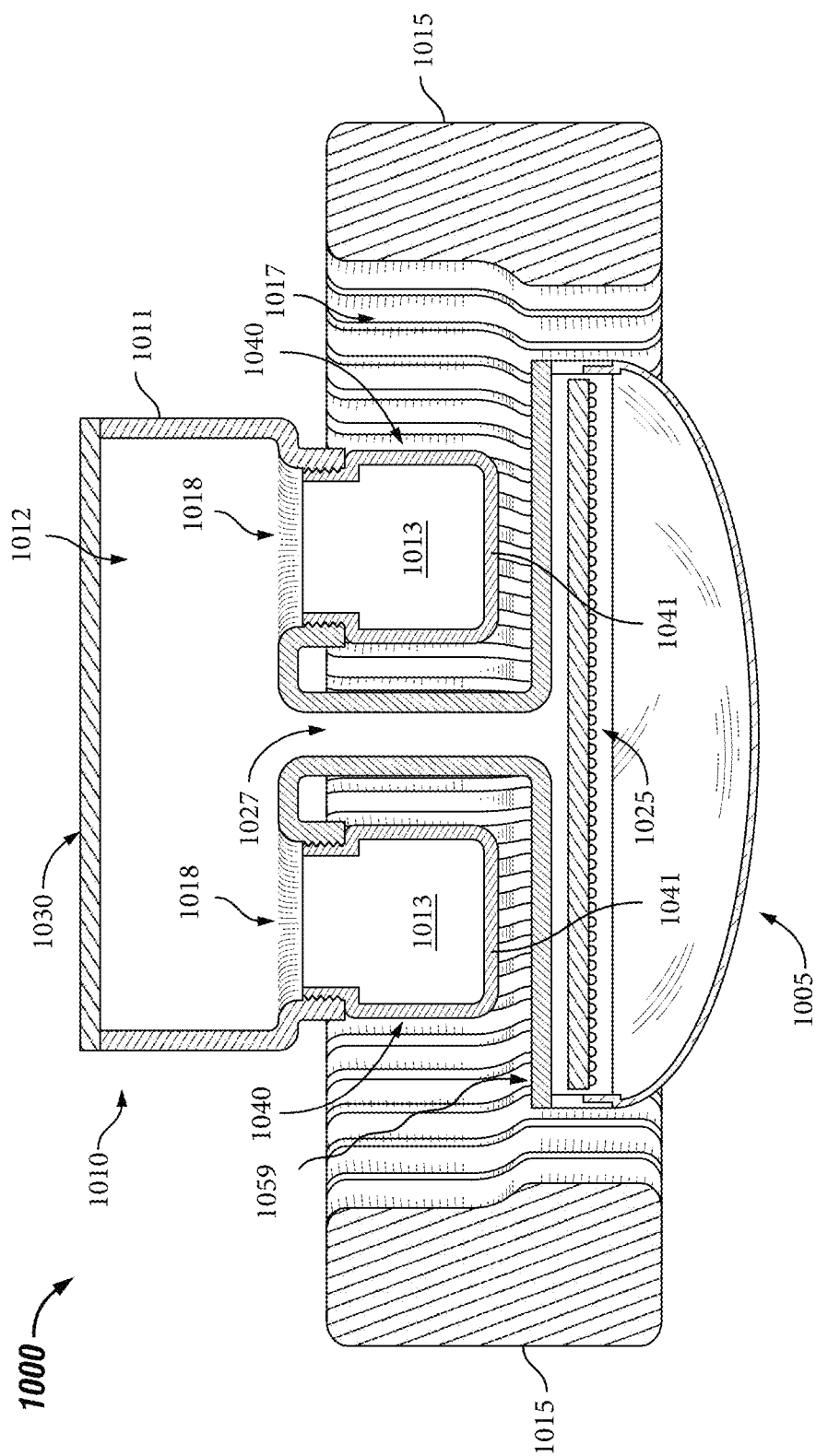

FIGS. 10A-10C show a light fixture 1000 in accordance with certain example embodiments. Specifically, FIG. 10A shows a cross-sectional front view of a subassembly 1001 of the light fixture 1000. FIG. 10B shows a front view of a removable piece 1040. FIG. 10C shows a cross-sectional front view of the light fixture 1000.

Referring to FIGS. 1A-10C, light fixture 1000 of FIG. 10C includes a subassembly 1009, as shown in FIG. 10A, and one or more removable pieces 1040, as shown in FIG.

10B. The subassembly 1009 includes a housing 1010 that has an upper housing section 1048 and a lower housing section 1059 (more generally called a light source housing portion). A cover 1030 is disposed on top of the upper housing section 1048 of the housing 1010, and light modules 1025 are disposed on a bottom surface of the lower housing section 1059 of the housing 1010. Also, a lens 1005 is coupled to the bottom of the lower housing section 1059 of the housing 1010. The upper housing section 1048 of the housing has one or more walls 1011 that form a cavity 1012 (which is partially enclosed by the cover 1030).

In this case, the housing 1010 also includes a wireway 1027 that connects the lower housing section 1059 to the upper housing section 1048. Here, the wireway 1027 is elongated and exposed, leaving a large air throughway 1017 between the upper housing section 1048 and the lower housing section 1059, allowing air to flow around the wireway 1027 independent of the heat sink fins 1005. There are multiple heat sink fins 1015 that extend radially from the outer perimeter of the lower housing section 1059 in this example.

One or more of the components 1013 of the light fixture 1000 are disposed within a removable piece 1040 rather than within the cavity 1012 of the upper housing section 1048 of the housing 1010. In this case, one or more of the walls 1011 of the upper housing section 1048 of the housing 1010 include one or more component positioning features 1018, where each component positioning feature 1018 includes a coupling feature 1019 (in this case, mating threads). Each coupling feature 1019 complements the coupling feature 1042 of a removable piece 1040. Each removable piece 1040 has a body 1041 that forms a cavity 1096, inside of which is disposed one or more components 1013. When a removable piece 1040 is coupled to the housing 1010, then the cavity 1096 of the removable piece 1040 can be part of the cavity 1012 of the housing 1010, and the body 1041 of the removable piece 1040 can be part of the wall 1011 of the housing 1010.

When each removable piece 1040 is coupled to a component positioning feature 1018 disposed on the upper housing section 1048 of the housing 1010, the removable piece 1040 is disposed in the air throughway 1017. The heat sink fins 1015, the upper housing section 1048, the lower housing section 1059, and the wireway 1027 can be configured in such a way as to allow a user to reach inside the air throughway 1017 and couple a removable piece 1040 to and decouple a removable piece 1040 from a component positioning feature 1018.

In certain example embodiments, by coupling (in this case, threading) a removable piece 1040 to a component positioning feature 1018, power and/or control signals can flow therethrough. In other words, the coupling feature 1019 of the component positioning feature 1018 and the coupling feature 1042 of the removable piece 1040 can provide both mechanical and electrical coupling for the one or more components 1013 disposed within the removable piece 1040. When the light fixture 1000 is located in a hazardous environment, the removable piece 1040, when coupled to a wall 1011 of the housing 1010, can form a flame path. A removable piece 1040, when coupled to the wall 1011 of the housing 1010, can cover an opening in the wall 1011.

Figure 11:
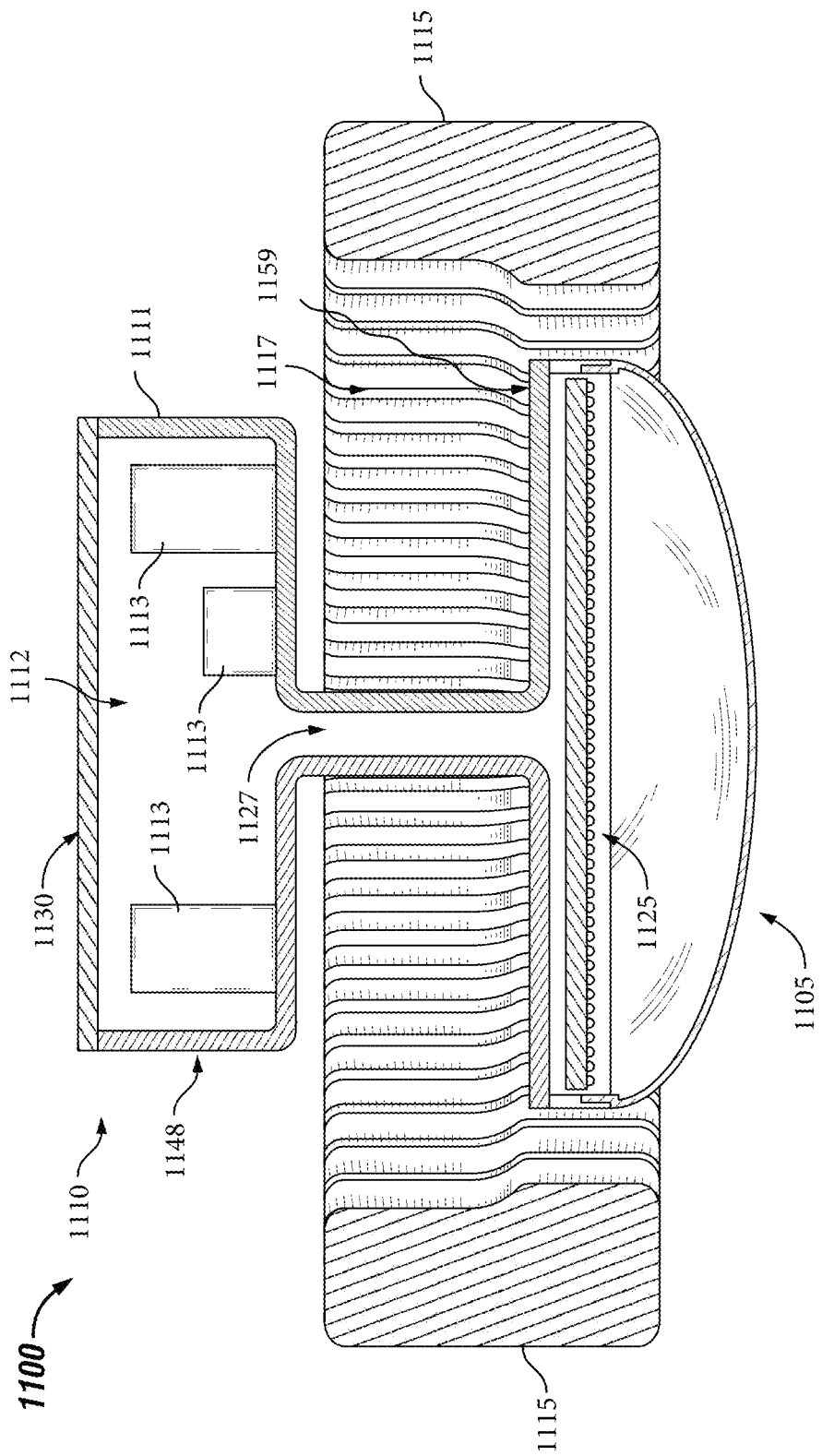
FIG. 11 shows another a light fixture in accordance with certain example embodiments.

FIG. 11 shows a cross-sectional side view of another light fixture 1100 in accordance with certain example embodiments. Referring to FIGS. 1A-1I, the light fixture 1100 of FIG. 11 is substantially the same as the light fixture 1000 of FIGS. 10A-10C, except as described below. For example, the housing 1110 that has an upper housing section 1148 and a lower housing section 1159 (more generally called a light source housing portion). A cover 1130 is disposed on top of the upper housing section 1148 of the housing 1110, and light modules 1125 are disposed on a bottom surface of the lower housing section 1159 of the housing 1110. Also, a lens 1105 is coupled to the bottom of the lower housing section 1159 of the housing 1110. The upper housing section 1148 of the housing has one or more walls 1111 that form a cavity 1112 (which is partially enclosed by the cover 1130).

In addition, the housing 1110 includes a wireway 1127 that connects the lower housing section 1159 to the upper housing section 1148. Here, the wireway 1127 is elongated and exposed, leaving a large air throughway 1117 between the upper housing section 1148 and the lower housing section 1159 to allow air to flow around the wireway 1127 independent of the heat sink fins 1105. There are multiple heat sink fins 1115 that extend radially from the outer perimeter of the lower housing section 1159 in this example. In this case, all of the components 1113 are disposed within the cavity 1112 of the upper housing section 1148, and the upper housing section 1148 of the housing 1110 do not include any component positioning features 1118.

Figure 12A:
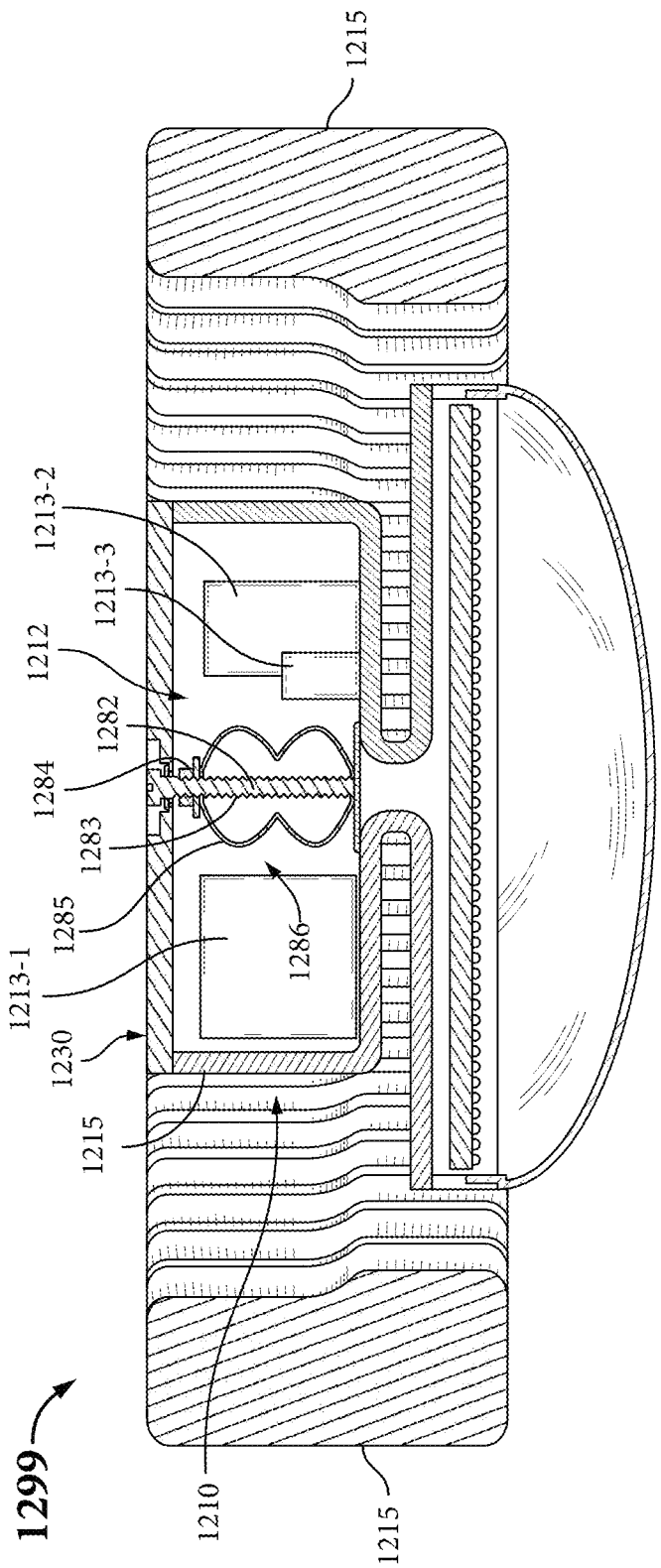
FIGS. 12A and 12B show another subassembly of a light fixture in accordance with certain example embodiments.
Figure 12B:
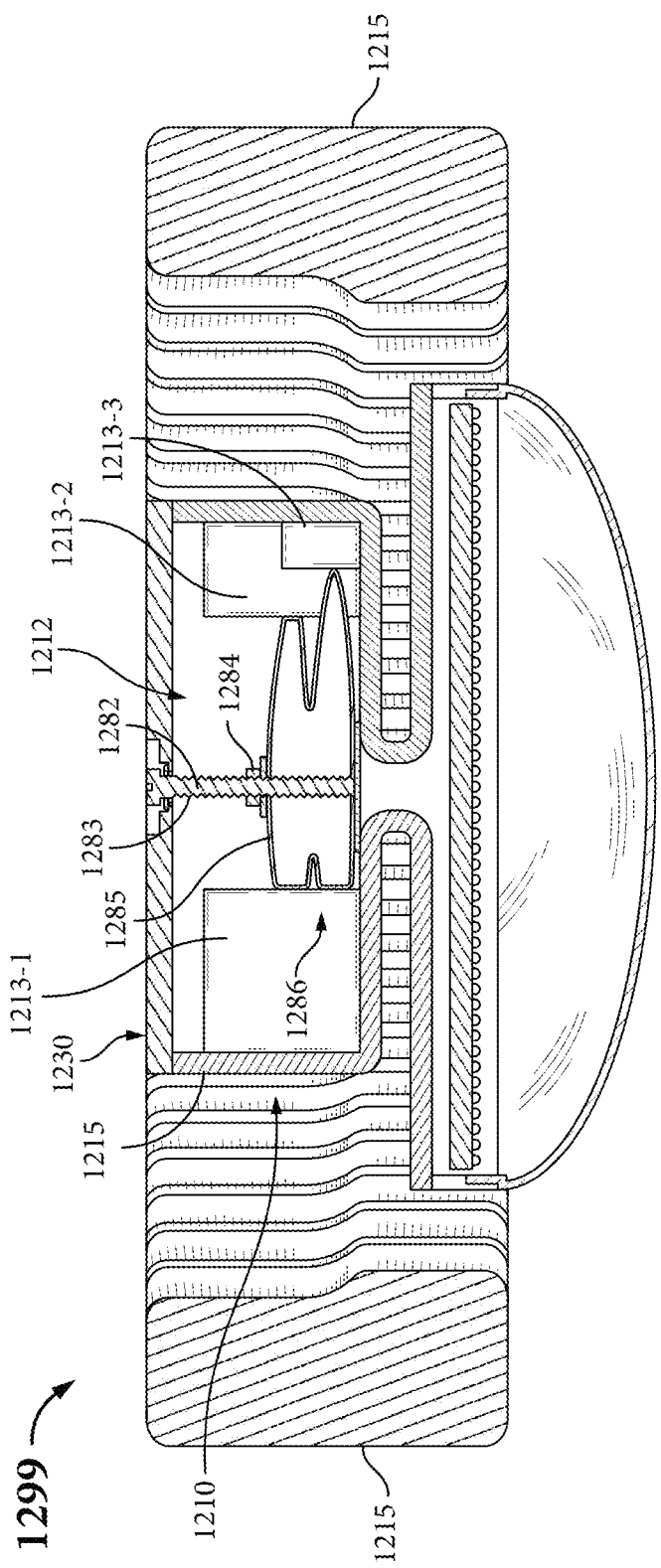

FIGS. 12A and 12B show another subassembly 1299 of a light fixture in accordance with certain example embodiments. Specifically, FIG. 12A shows a cross-sectional side view of the subassembly 1299 in a disengaged state. FIG. 12B shows a cross-sectional side view of the subassembly 1299 in an engaged state. Referring to FIGS. 1A-12B, the subassembly 1299 of FIGS. 12A and 12B includes a housing 1210 having at least one wall 1211 that forms a cavity 1212. A cover 1230 is disposed atop the housing 1210 and encloses the cavity 1212. A number of heat sink fins 1215 extend radially away from the outer surface of the walls 1211. Inside the cavity 1212 are a number of components 1213.

In addition, the subassembly 1299 includes a configurable component positioning feature 1286 that is disposed within (in this, at the center of) the cavity 1212. In this case, the configurable component positioning feature 1286 includes a reconfiguration mechanism 1285, a driver 1284, and a structure 1282. The driver 1284 (in this case, a nut) is movably coupled to the structure 1282 (in this case, a rod having mating threads 1283 disposed on its outer surface, where driver 1284 moves along the mating threads 1283). When the driver 1284 moves along the structure 1282, the driver 1284 forces the reconfiguration mechanism 1285 to move.

In its default state, as shown in FIG. 12A, the reconfiguration mechanism 1285 minimally protrudes outward, and the height of the reconfiguration mechanism 1285 is substantially the same as the height of the cavity 1212. When the reconfiguration mechanism 1285 is compressed, as shown in FIG. 12B, the reconfiguration mechanism 1285 extends outward into the cavity. Eventually, as the reconfiguration mechanism 1285 continues to be compressed, the reconfiguration mechanism 1285 comes into contact with one or more components 1213 within the cavity 1212. Eventually, the reconfiguration mechanism 1285 extends far enough to push and hold all of the components 1213 in the cavity 1212 against a wall 1211 of the housing 1210, thereby ensuring more efficient thermal communication between the walls 1211 of the housing 1210 and the components 1213.

In certain example embodiments, the reconfiguration mechanism 1285 is made of a semi-resilient material (e.g., rubber) and/or have a semi-resilient form (e.g., a spring) that substantially holds form to overcome the resistance of pushing the components 1213 toward a wall 1211, and then deforms when a component 1213 abuts against a wall 1211, holding the component 1213 in place against the wall 1211. The reconfiguration mechanism 1285 can be aimed in discrete directions within the cavity 1212. Alternatively, the reconfiguration mechanism 1285 can cover a full circumference around the structure 1282.

The components 1213 can also be released from abutting against a wall 1211 of the housing 1210 by reversing the process. Specifically, the driver 1284 can be moved upward along the structure 1282, thereby pulling or allowing the reconfiguration mechanism 1286 to return to its default state, as shown in FIG. 12A. When this occurs, the components 1213 can lose direct contact with the walls 1211, thereby reducing the effectiveness of thermal transfer from the components 1213 to the walls 1211 of the housing 1210.

Those of ordinary skill in the art will appreciate that there can be a number of other components and/or configurations of the configurable component positioning feature 1286 to provide an on-demand forced contact between the components 1213 and the walls 1211 of the housing 1210. Examples of such other components and/or configurations can include, but are not limited to, an inflatable device, a pneumatic system, a ratcheting mechanism, a movable ramped component, and horizontally sliding devices.

Example embodiments can allow for more reliable and efficient light fixtures, particularly when those light fixtures are located in hazardous environments. Example embodiments, allow for modular configurations of a light fixture (or portions thereof) while allowing the light fixture to comply with applicable standards. Such a feature allows for flexible designs, both electrically and mechanically. Example embodiments can also allow improved thermal efficiency of a light fixture without the use of air moving devices or other features that consume power.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A housing for a light fixture, the housing comprising:
   at least one wall that forms a cavity and a light source housing portion, wherein the at least one wall comprises a thermally-conductive material, wherein the light source housing portion is configured to receive at least one light source;
   a wireway disposed between the cavity and the light source housing portion;
   a plurality of heat sink fins that extend from an outer surface of the at least one wall; and
   at least one air throughway that exposes at least a portion of the wireway between the at least one wall and the light source housing portion, wherein the at least one air throughway allows ambient air to pass directly around the portion of the wireway to remove heat generated by electrical components disposed within the cavity and by the at least one light source, wherein the at least one air throughway is formed independent of the plurality of heat sink fins.

2. The housing of claim 1, wherein the at least one wall is configured to be rotatable when the light fixture is mounted to a structure, wherein the at least one wall is rotated to orient the at least one air throughway along a path of ambient air flow.

3. The housing of claim 1, wherein the at least one air throughway is disposed in the at least one wall.

4. The housing of claim 1, wherein the light source housing portion is part of at least one local housing that is separated from the at least one wall by the wireway.

5. The housing of claim 4, wherein the at least one local housing has an additional plurality of heat sink fins that extend therefrom, wherein the at least one air throughway is further formed independent of the additional plurality of heat sink fins.

6. The housing of claim 1, wherein the at least one wall comprises a removable piece that couples to a remainder of the at least one wall, wherein the removable piece is adjacent to the at least one air throughway, wherein removing the at least one piece enlarges the at least one air throughway.

7. The housing of claim 1, wherein the at least one wall comprises a removable piece that couples to a remainder of the at least one wall, wherein the removable piece comprises a channel that forms an additional air throughway.

8. The housing of claim 1, wherein the at least one wall and the plurality of heat sink fins are cast as a single piece.

9. A housing for a light fixture, the housing comprising:
   at least one wall that forms a cavity, wherein the at least one wall comprises a thermally-conductive material;
   at least one positioning feature disposed within the cavity, wherein the at least one positioning feature is configured to movably position at least one component of the light fixture within the cavity against the at least one wall, wherein the at least one component generates heat when operating, and wherein the at least one positioning feature is configured to abut the at least one component against the at least one wall so that the at least one wall absorbs heat generated by the at least one component.

10. The housing of claim 9, wherein the at least one positioning feature is located on an inner surface of the at least one wall.

11. The housing of claim 10, wherein the at least one positioning feature comprises a pair of slots configured to slidably receive a thermally-conductive platform on which the at least one component is mounted.

12. The housing of claim 11, wherein the thermally-conductive platform abuts against the at least one wall.

13. The housing of claim 9, wherein the at least one positioning feature is configured to push and hold the at least one component against the at least one wall.

14. The housing of claim 13, wherein the at least one positioning feature is retractable.

15. The housing of claim 9, wherein the at least one positioning feature comprises an electrical coupling feature that is configured to electrically couple the at least one component to at least one other component.

16. A housing for a light fixture, the housing comprising:
   at least one wall that forms a cavity, wherein the at least one wall comprises a thermally-conductive material, a cover receiving feature, and at least one first coupling feature, wherein the cover receiving feature is configured to couple to a cover of the light fixture;
   at least one removable wall section removably coupled to the at least one wall, wherein the at least one removable wall section comprises:

at least one second coupling feature that removably couples to the at least one first coupling feature of the at least one wall;

an inner surface comprising the thermally-conductive material that is configured to couple to at least one heat-generating component, wherein the at least one removable section covers an opening in the at least one wall, wherein the at least one heat-generating component is configured to abut against the inner surface so that the inner surface absorbs heat generated by the at least one heat-generating component.

17. The housing of claim 16, wherein the at least one first coupling feature and the at least one second coupling feature are configured to electrically couple the at least one heat-generating component to another component of the light fixture.

18. The housing of claim 16, wherein the at least one removable section is thermally isolated from the at least one wall.

19. The housing of claim 16, wherein the at least one first coupling feature and the at least one second coupling feature, when coupled to each other, form a flame path.

* * * * *